United States Patent
Seksaria et al.

(10) Patent No.: US 6,755,461 B2
(45) Date of Patent: Jun. 29, 2004

(54) MODULAR FRONT END FOR A MOTOR VEHICLE

(75) Inventors: Dinesh C. Seksaria, Novi, MI (US); Edward A. Timko, Jeannette, PA (US); John W. Cobes, Lower Burrell, PA (US); Todd L. Summe, Pittsburgh, PA (US); Kevin R. Pinegar, Ypsilanti, MI (US); Thomas J. Murphy, Jeannette, PA (US)

(73) Assignee: Aloca Inc., Pittsburgh, PA (US)

( * ) Notice: Subject to any disclaimer, the term of this patent is extended or adjusted under 35 U.S.C. 154(b) by 0 days.

(21) Appl. No.: 10/271,462

(22) Filed: Oct. 16, 2002

(65) Prior Publication Data

US 2003/0085591 A1 May 8, 2003

Related U.S. Application Data

(60) Provisional application No. 60/329,802, filed on Oct. 16, 2001.

(51) Int. Cl.[7] .............................................. B62D 25/08
(52) U.S. Cl. ............................ 296/193.04; 296/193.09; 296/203.02
(58) Field of Search .................. 296/187.02; 29/897.2; 276/87.02, 193.01, 193.05, 193.04, 193.09, 193.1, 205, 205.02, 897.2; 260/785; 180/321; 1/311

(56) References Cited

U.S. PATENT DOCUMENTS

| | | | |
|---|---|---|---|
| 4,881,756 A | * 11/1989 | Kumasaka et al. | 296/193.03 |
| 4,978,164 A | * 12/1990 | Nakamura et al. | 296/193.04 |
| 5,533,780 A | 7/1996 | Larson et al. | 296/194 |
| 5,619,784 A | * 4/1997 | Nishimoto et al. | 296/193.01 |
| 5,806,919 A | * 9/1998 | Davies | 296/205 |
| 5,882,064 A | * 3/1999 | Emmons | 296/193.04 |
| 6,108,193 A | 8/2000 | Haberstroh | 361/600 |
| 6,216,810 B1 | 4/2001 | Nakai et al. | 180/68.4 |
| 6,276,477 B1 | 8/2001 | Ida | 180/89.1 |
| 6,293,615 B1 | 9/2001 | Tarahomi | 296/194 |
| 6,308,999 B1 | 10/2001 | Tan et al. | 293/109 |
| 6,334,645 B1 | 1/2002 | Ban | 296/198 |
| 6,336,624 B1 | 1/2002 | Kulhavy | 267/64.12 |
| 6,357,821 B1 | 3/2002 | Maj et al. | 296/194 |
| 6,416,119 B1 | 7/2002 | Gericke et al. | 296/205 |
| 6,540,284 B2 | * 4/2003 | Miyata | 296/203.02 |

* cited by examiner

*Primary Examiner*—Jason Morrow
(74) *Attorney, Agent, or Firm*—Gary P. Topolosky; Grant E. Coffield; Eckert Seamans Cherin & Mellott, LLC

(57) ABSTRACT

The modular front end forms the front portion of a motor vehicle. The modular front end includes a bulkhead defining a plurality of integrally formed attachment mounts. A drive train assembly carrying at least an engine of the motor vehicle is attached to the bulkhead at the attachment mounts. A crash energy absorption assembly is attached to the attachment mounts on the bulkhead and generally extends around the drive train assembly. An apron assembly is attached to the bulkhead at the attachment mounts and is generally positioned above the drive train assembly and crash energy absorption assembly.

58 Claims, 21 Drawing Sheets

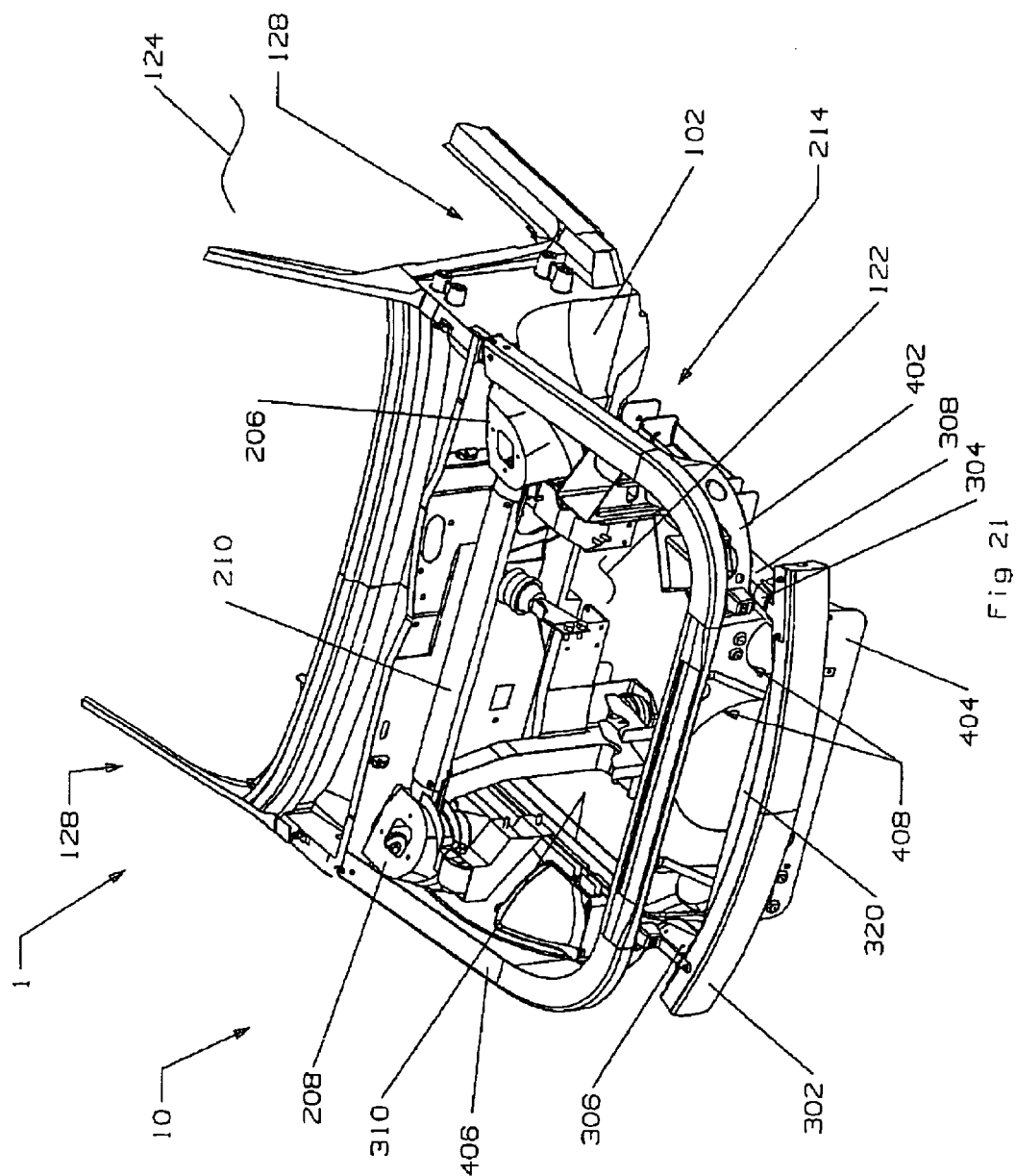

MODULAR FRONT END FOR A MOTOR VEHICLE

CROSS REFERENCE TO RELATED APPLICATIONS

This application claims the benefit of U.S. Provisional Patent Application Serial No. 60/329,802, filed Oct. 16, 2001, and entitled "Modular Front End For Passenger Cars And Light Trucks, Joining An Integrated Drive Train Module, Apron-Cum Energy Module And Crash Energy Management Module To An Integrated Structural Cowl", the full disclosure of which is incorporated herein by reference.

BACKGROUND OF THE INVENTION

1. Field of the Invention

The present invention relates generally to motor vehicles, such as passenger cars and light trucks. More particularly, the present invention relates generally to a multi-component front end for a motor vehicle, which advances the methods by which motor vehicles are assembled.

2. Description of Related Art

Currently, the front ends of most motor vehicles are built into the vehicle body one piece or component at a time. The installation of literally hundreds of different components in the motor vehicle front end requires the manufacturer to maintain lengthy, complex, and costly assembly lines as well as extensive tooling and fixtures. This complexity is due not only to the high number of parts involved, but also the assembly methods currently used in the automotive industry and the amount of on-line adjusting and repair that is often needed to correct assembly defects. Additionally, the well-known assembly line process is highly labor intensive, again due mainly to the high number of parts and assembly methods currently used in the automotive industry.

Typically, once a painted vehicle body comes to the finish assembly line, hundreds of individual components are assembled to the vehicle body. The numerous individual components are used to complete the suspension system, steering and braking system, power train, cooling system, electrical system, etc. As stated, the individual components comprising these systems are typically added to the vehicle body one-by-one or in small subgroups to finish the assembly of the motor vehicle.

The large number of components required to assemble a motor vehicle requires the assembly line to be extremely long and requires many people to accomplish numerous discreet tasks along the assembly line. This makes the process of motor vehicle assembly unnecessarily slow and complicated and adversely affects the quality and reliability of the motor vehicle when it is completed. Additionally, the confined space within which the workers operate makes on-line service and repair tasks difficult and even dangerous. The overall complexity of the current system for assembling motor vehicles is unnecessarily slow and expensive and there is considerable room for improvement.

SUMMARY OF THE INVENTION

The present invention applies the general concept of using modules or assemblies in the manufacturing of motor vehicles. The concepts and embodiments disclosed hereinafter may be applied to other industries that utilize the long-standing assembly line technique for producing finished products, such as the aircraft, agricultural machinery, truck manufacturing, and mining vehicle industries. Generally, the present invention is a motor vehicle comprising a vehicle body having a pre-assembled, modular front end. The modular front end is comprised of several sub-modules or sub-assemblies, as discussed hereinafter.

The modular front end is based on the concept of "functionally decoupling" the several sub-modules or sub-assemblies from each other. In front end assembly techniques currently practiced in the art, the various elements or components of the front end are substantially interconnected or related. In contrast, the modular front end of the present invention has the various sub-assemblies comprising the front end substantially functionally isolated from one another. The separate functions of the sub-assemblies, which will be discussed hereinafter, are substantially independent from one another allowing any one sub-module or sub-assembly to be individually replaced without affecting the other sub-modules or sub-assemblies. This allows the sub-modules or sub-assemblies to be comprised of smaller and lighter individual components or parts, which is not easily possible in the "inter-related" front end structures generally found in the prior art. The use of separate and distinct sub-modules or sub-assemblies in the modular front end allows the overall size of the modular front end to be reduced because the sub-assemblies may be compact tightly within the modular front end. The smaller front end made possible by the modular front end of the present invention improves the overall driving and handling characteristics of the motor vehicle. For example, the smaller front end is lower in profile than those currently known in the art, which improves the driver's view of the road and aids the driver in performing routine vehicle operations such as parking, turning, etc.

Generally, the modular front end comprises a bulkhead having a plurality of preferably integrally formed attachment mounts, a drive train assembly attached to the bulkhead at the attachment mounts, a crash energy absorption assembly attached to the bulkhead at the attachment mounts and, further, an apron assembly attached to the bulkhead assembly at the attachment mounts. The apron assembly may be at least partially supported in the vertical direction by the crash energy absorption assembly. The drive train assembly, crash energy absorption assembly, and apron assembly are each preferably attached mechanically to the bulkhead.

The bulkhead is preferably a cast bulkhead comprising a plurality of integrally formed attachment mounts. The bulkhead may be cast from aluminum alloy as a unitary body. The bulkhead may also be comprised of a plurality of individually cast components. The bulkhead may be provided as part of a bulkhead assembly. The bulkhead assembly may comprise a cast bulkhead defining a plurality of integrally formed attachment mounts and at least one structural member of the motor vehicle attached to the bulkhead. The bulkhead assembly may further include one or more electrical components attached to the bulkhead.

The bulkhead may define at least one hollow cavity formed therein for increasing strength and rigidity of the bulkhead. The at least one hollow cavity may be filled with a cast-in-place core, preferably an aluminum foam core. The hollow cavity may also be filled with polymeric foam. The at least one structural member may comprise a pair of door hinge pillars attached to attachment mounts located at opposite ends of the bulkhead. The at least one structural member may also comprise a pair of rocker panels attached to a bottom end of the bulkhead opposite the door hinge pillars. Additionally, the at least one structural member may comprise a pair of windshield support pillars attached to a top end of the bulkhead. The at least one structural member may further comprise a windshield cross member attached to the top end of the bulkhead between the windshield support pillars.

The bulkhead may comprise a first side for facing an engine compartment of the motor vehicle and a second side for facing a passenger compartment of the motor vehicle. A pair of hood hinges, which may each include a hood lift assist mechanism, may be attached to attachment mounts located on the first side of the bulkhead for supporting a hood of the motor vehicle. The electrical component(s) is preferably attached to the first side of the bulkhead, but may be attached to the second side facing the passenger compartment. The electrical component(s) may include, for example, a windshield wiper motor and/or an electrical junction box.

The drive train assembly generally comprises a drive train support and a power train assembly attached to the drive train support. The drive train support comprises a pair of elongated support members that are configured for attachment, preferably by mechanical means, to a bulkhead of the motor vehicle. By mechanical attachment or means, it is meant that mechanical fasteners, such as nuts and bolts, rivets, and the like are preferably used to attach the various elements described in this disclosure, and may include rubber isolation mounts (i.e., bushings), where necessary, to minimize vibration between elements. The drive train support further comprises a cross member interconnecting the support members. The support members are further configured to support the power train assembly such that the power train assembly is cantilevered from the support members and bulkhead forward of the cross member.

The support members and cross member may be made of aluminum alloy. The support members may be cast aluminum alloy support members. The cross member may be an extruded aluminum alloy cross member. The support members each comprise a top end and a bottom end. The cross member preferably connects the top ends of the support members. The cross member may be connected mechanically to the support members.

In the modular front end, the power train assembly is attached to the support members such that the power train assembly is cantilevered from the support members and bulkhead forward of the cross member. The support members may be attached mechanically to the bulkhead. The mechanical attachment may comprise at least one isolation mount for dampening vibration of the power train assembly. The power train assembly may comprise an engine and transmission of the motor vehicle. The engine may be mechanically attached to the drive train support and comprise at least one isolation mount for dampening vibration of the engine. The transmission may be mechanically attached to the drive train support and comprise at least one isolation mount for dampening vibration of the transmission. The drive train assembly may further comprise a steering gear of the motor vehicle attached to the bottom ends of the support members and interconnecting the bottom ends of the support members. Further, the drive train assembly may comprise a brake and suspension assembly for each front wheel of the motor vehicle. The brake and suspension assemblies are attached to the support members, respectively, and preferably the lower ends of the support members. The brake and suspension assemblies may each comprise a control arm connected to the respective support members, preferably mechanically.

The crash energy absorption assembly generally comprises an elongated bumper beam, a pair brackets attached to the bumper beam, and a pair of tubes supported by the brackets. The tubes each have a first end and a second end. The first ends of the tubes are supported by the brackets. The second ends of the tubes may be attached to the bulkhead at the attachment mounts. A cross tie may interconnect the brackets. The bumper beam, brackets, and tubes may be made of aluminum alloy.

The bumper beam may define a substantially open cross section, which may be at least partially, but preferably completely, filled with polymeric foam. The bumper beam may define a substantially $\Sigma$-shaped cross section. The substantially $\Sigma$-shaped cross section may comprise a rear wall connected to substantially parallel top and bottom walls. The brackets may be attached to the bumper beam opposite the rear wall.

The tubes may be at least partially filled with polymeric foam. The tubes may comprise a tube with a cross-sectional profile selected from the group consisting of a circle, a square, an oval, a rectangle, a hexagon, and a combination thereof. The tubes may have different cross-sectional profiles. The brackets are preferably attached mechanically to the bumper beam. The brackets may define sockets configured to receive the first ends of the tubes. The tubes may be secured mechanically in the sockets. The bumper beam may define an overall curved shape. In the modular front end, the second ends of the tubes are attached to the bulkhead at the attachment mounts. The brackets may be taper and flare brackets, which absorb impact energy using the taper and flare principle known in the art. Alternatively, the brackets may be conventional brackets and the tubes may be crush tubes for absorbing crash energy during a collision.

The apron assembly generally comprises an apron and, preferably, at least one engine accessory of the motor vehicle attached to the apron. The apron generally comprises a substantially C-shaped, unitary apron member having a depending front portion and a substantially C-shaped apron rail attached to a top end of the apron member. The apron member defines at least one integrally formed accessory attachment mount for mounting the at least one engine accessory of the motor vehicle. The apron rail is attached to the top end of the apron member and is configured for attachment to the bulkhead. Preferably, the ends of the apron rail are attached to the bulkhead. The apron rail may be configured for mechanical attachment to the bulkhead. The apron rail is preferably attached mechanically to the apron member. The apron member is preferably formed of molded plastic material and the apron rail is preferably made of aluminum alloy. The apron rail may be a hydra-formed tube defining differing cross-sectional areas along its length, which provide mounting locations for various front end components of the motor vehicle such as the vehicle fenders. The at least one accessory attachment mount may comprise a plurality of openings defined in the front portion of the apron member.

The at least one engine accessory may be a radiator and cooling fan assembly and the accessory attachment mount may be an opening defined in the front portion of the apron member. The radiator and cooling fan is supported in the opening. The at least one engine accessory may be an air conditioning condenser and the attachment mount may be a second opening defined in the front portion of the apron member. The air conditioning condenser is supported in the second opening. Additionally, the at least one engine accessory may be a transmission oil cooler and the accessory attachment mount may be a third opening defined in the front portion of the apron member. The transmission oil cooler is supported in the third opening. Further, the at least one engine accessory may be a battery and the accessory attachment mount may be an integrally formed battery hold-down. The battery is supported in the battery hold down. The apron assembly may further comprise fenders attached to the apron rail and/or headlights attached to the front portion of the apron member. Other possible engine accessories include fluid reservoirs for the radiator and cooling assembly, windshield wiper fluid etc.

The present invention is also a method of assembling a modular front end for a motor vehicle. The method comprises the steps of providing a bulkhead having a plurality of attachment mounts; attaching a drive train assembly to the bulkhead at the attachment mounts; attaching a crash energy absorption assembly to the bulkhead at the attachment mounts, and attaching an apron assembly to the bulkhead at the attachment mounts. The bulkhead may be pre-attached to the vehicle body and the various assemblies identified hereinabove assembled to the pre-attached bulkhead. Thus, the step of providing the bulkhead includes both a separate, stand alone bulkhead that is to be attached to a vehicle body, and a bulkhead that is pre-attached to a vehicle body.

The method may further comprise the step of casting the bulkhead as a unitary bulkhead. The attachment mounts are preferably formed integrally with the unitary bulkhead. The bulkhead may be cast from aluminum alloy. The method may further comprise the step of attaching at least one structural member of the motor vehicle to the bulkhead.

The bulkhead may comprise a first side for facing an engine compartment of the motor vehicle and a second side for facing a passenger compartment of the motor vehicle. The method may comprise the step of attaching at least one electrical component of the motor vehicle to the first side of the bulkhead. The drive train assembly, crash energy absorption assembly, and apron assembly may be attached mechanically to the attachment mounts located on the first side of the bulkhead.

The drive train assembly may comprise a drive train support and a power train assembly. The power train assembly may comprise an engine and a transmission of the motor vehicle attached to the drive train support. The step of attaching the drive train assembly to the bulkhead may comprise attaching the drive train support to the bulkhead at the attachment mounts such that the power train assembly is cantilevered from the drive train support and bulkhead. The power train support may comprise a pair of support members each having a top end and a bottom end and a cross member connecting the top ends of the support members. The method may further comprise the step of attaching a steering gear of the motor vehicle to the bottom ends of the support members to interconnect the support members. The drive train assembly may further comprise a brake and suspension assembly for each front wheel of the motor vehicle. Further, the method may comprise the step of attaching the brake and suspension assemblies to the support members, respectively.

The crash energy absorption assembly may comprise an elongated bumper beam, a pair of brackets attached to the bumper beam, and a pair of tubes each having a first end and a second end. The first ends of the tubes may be supported by the brackets. The step of attaching the crash energy absorption assembly to the bulkhead may comprise attaching the second ends of the tubes to attachment mounts preferably located on the first side of the bulkhead.

The apron assembly may be partially supported in the vertical direction by the crash energy absorption module. The apron assembly may comprise an apron member and at least one engine accessory of the motor vehicle attached to the apron member. The method may further comprise the step of attaching the at least one engine accessory of the motor vehicle to the apron member. The at least one engine accessory may be a radiator and cooling fan assembly, an air conditioning condenser, a transmission oil cooler, and/or a battery. Other possible engine accessories include fluid reservoirs for the radiator and cooling assembly, windshield wiper fluid etc. The apron member may be substantially C-shaped and have a depending front portion. The apron assembly may further comprise a substantially C-shaped apron rail. The method may comprise the step of attaching the apron rail to a top end of the apron member. The ends of the apron rail may be configured for connection to the bulkhead at the attachment mounts. The step of attaching the apron assembly to the bulkhead may comprise attaching the ends of the apron rail to the bulkhead at the attachment mounts. Furthermore, the method may comprise the steps of attaching one or more fenders of the motor vehicle to the apron rail, and attaching headlights of the motor vehicle to the front portion of the apron member.

Further details and advantages of the present invention will become apparent from the following detailed description when read in conjunction with the drawings, wherein like parts are designated with like reference numerals throughout.

BRIEF DESCRIPTION OF THE DRAWINGS

FIG. 21 is a second perspective view of the modular front end shown in FIG. 20.

DESCRIPTION OF THE PREFERRED EMBODIMENTS

Figure 1:
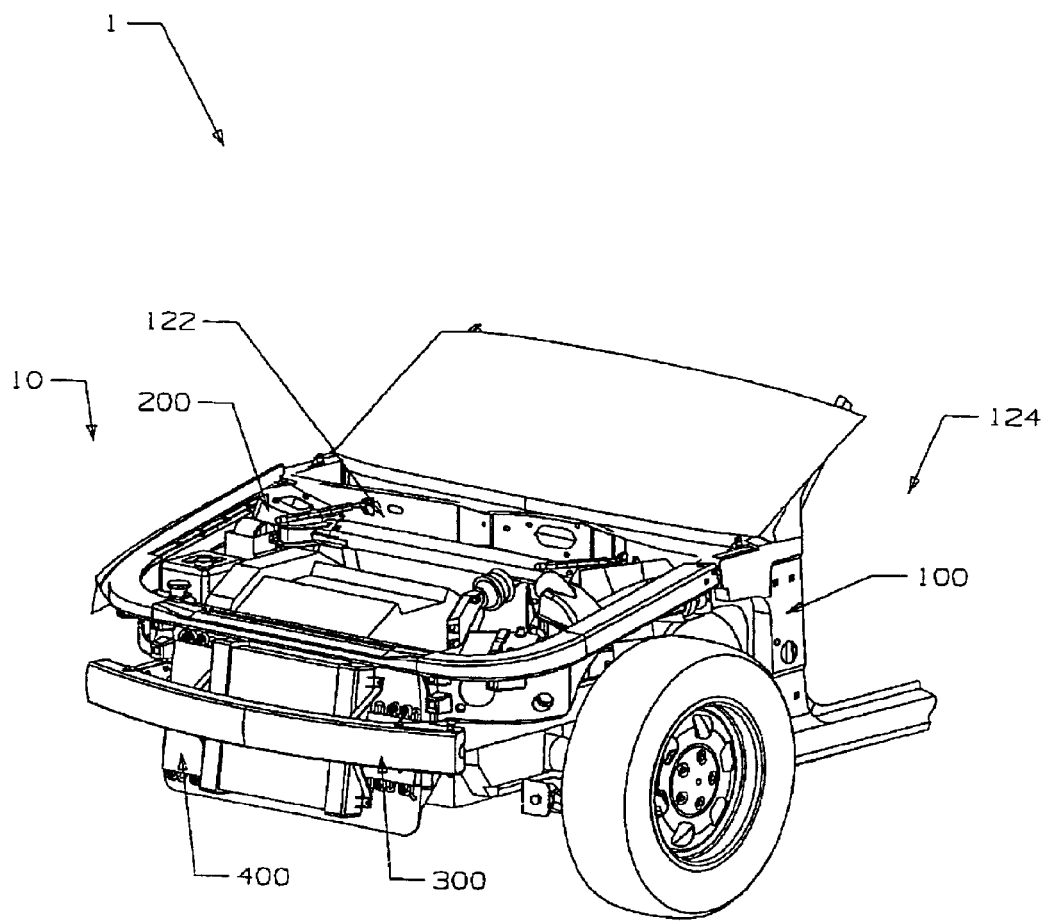
FIG. 1 is a perspective view of a motor vehicle having a modular front end in accordance with the present invention.

For purposes of the description hereinafter, the terms "upper", "lower", "right", "left", "vertical", "horizontal", "top", "bottom", and derivatives thereof shall relate to the invention, as it is oriented in the drawing figures. However, it is to be understood that the invention may assume various alternatives and step sequences, except where expressly specified to the contrary. It is also to be understood that the specific elements and processes illustrated in the drawings, and described in the following specification, are simply exemplary embodiments of the invention. Hence, specific dimensions and other physical characteristics related to the embodiments disclosed herein are not to be considered limiting.

Figure 2:
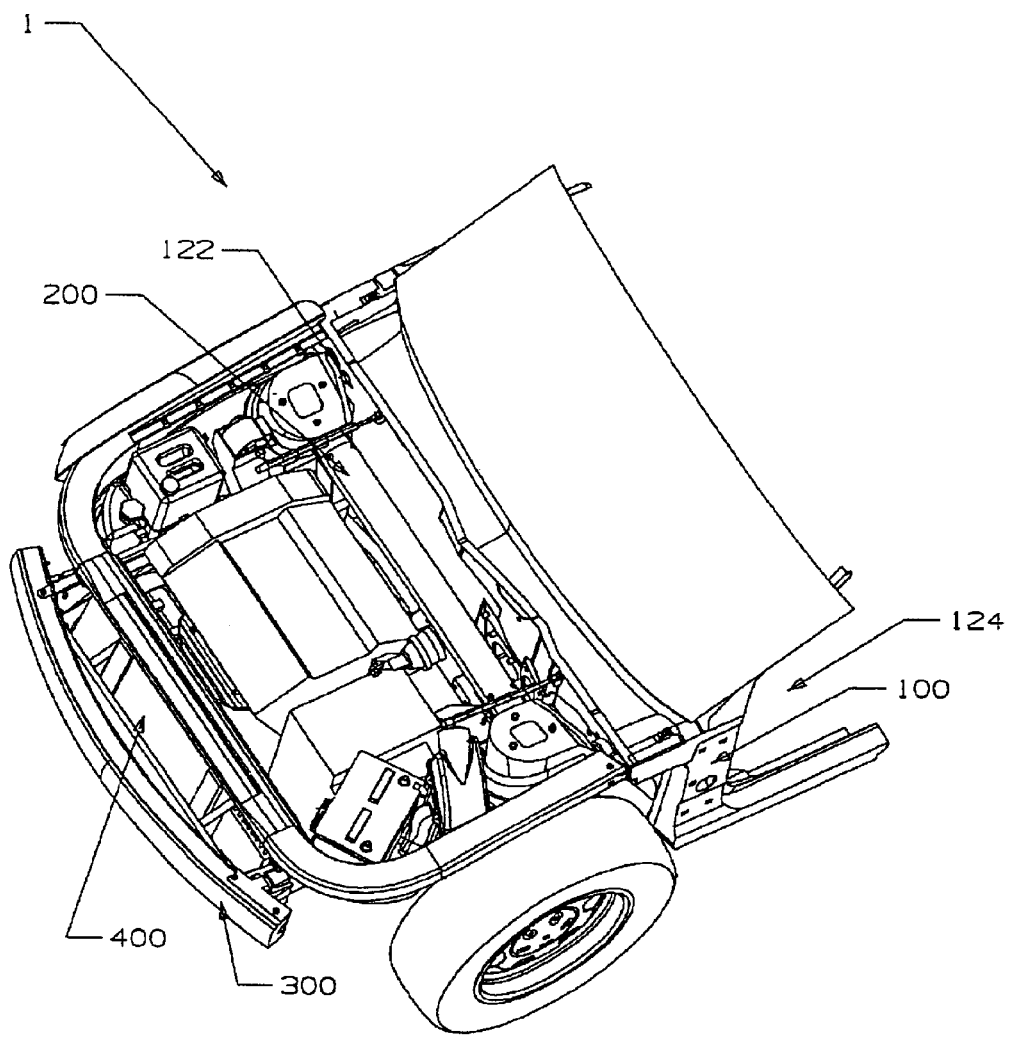
FIG. 2 is a perspective view of the modular front end shown in FIG. 1.

Referring to FIGS. 1 and 2, a motor vehicle 1 comprising a modular front end 10 in accordance with the present invention is shown. Only the front portion of the motor vehicle 1 is shown, but the remainder of the motor vehicle 1 is conventional. The modular front end 10 forms the complete front portion of the motor vehicle 1. Once assembled, the modular front end 10 may be attached to the body of the motor vehicle 1 substantially in one step, significantly increasing the efficiency of assembling the motor vehicle 1. The modular front end 10 preferably arrives pre-assembled to the assembly line where it is joined to the body of the motor vehicle 1. The modular front end 10 allows the length of the assembly line to be reduced because the large number of parts typically found in the front end of the motor vehicle 1 is now consolidated into several sub-modules or sub-assemblies, each of which is described in detail hereinafter. The modular front end 10 also reduces the assembly equipment and the number of workers required to manufacture the motor vehicle 1. Further, the individual assemblies comprising the modular front end 10 may be tested for performance prior to their installation in the modular front end 10, which improves the overall quality of the motor vehicle 1.

The modular front end 10 is generally comprised of four (4) separate sub-modules or assemblies. The four distinct modules include a bulkhead assembly 100, a drive train assembly 200, a crash energy absorption assembly 300, and an apron assembly 400. The bulkhead assembly 100 generally provides the structural support for mounting and supporting the other assemblies 200, 300, 400. The drive train assembly 200 is directly attached to the bulkhead assembly 100. The crash energy absorption assembly 300 is positioned generally around the lower portion of the drive train assembly 200 and is also directly attached to the bulkhead assembly 100. The apron assembly 400 is generally positioned on top of the drive train assembly 200 and the crash energy absorption assembly 300, and generally surrounds the drive train assembly 200. Each of the assemblies 100–400 will be discussed in detail hereinafter, as well as a preferred method of assembling the modular front end 10 of the motor vehicle 1.

The various assemblies 100–400 are independent of one another or "functionally de-coupled" from one another and are generally interrelated by their connection to the bulkhead assembly 100, which provides the structural support for the other assemblies 200–400. The bulkhead assembly 100 may be provided separately from or pre-attached to the body of the motor vehicle 1. Thus, the modular front end 10 may be pre-assembled and attached to the body of the motor vehicle 1, or the bulkhead assembly 100 may be pre-attached to the body of the motor vehicle 1 and the other assemblies 200–400 then attached to the bulkhead assembly 100.

Referring to FIGS. 1–7, the bulkhead assembly 100 is generally comprised of a cast, preferably unitary, bulkhead 102 and a plurality of components or parts, such as structural members of the motor vehicle, attached to the bulkhead 102. The bulkhead 102 serves as the base structural component that the supports the drive train assembly 200, the crash energy absorption assembly 300, and the apron assembly 400.

The unitary bulkhead 102 is preferably an ultra-large casting of aluminum or aluminum alloy or a similar material such as magnesium alloy, or formed of fiber reinforced polymer composite materials. The bulkhead 102 is a unitary bulkhead that replaces the typical 10 to 15 stamped steel parts typically used in existing bulkhead designs. The use of aluminum and aluminum alloys reduces the weight of bulkhead 102 in comparison to traditional bulkhead designs. The bulkhead 102 may also be formed of multiple cast components, each preferably cast from aluminum alloy, and joined together by means customary in the art.

The bulkhead 102 is preferably cast with one or more hollow cavities 104 formed therein for increasing the strength and rigidity of the bulkhead 102. The hollow cavity 104 may be filled with a cast-in-place core or polymeric foam 106. The cast-in-place core 106 is preferably aluminum foam. When polymeric foam is used, the polymeric foam 106 is filled into the hollow cavity 104 after casting. The cast-in-place aluminum foam core or polymeric foam 106 increases the strength and stiffness of the system but also reduces the chance of internal corrosion in the bulkhead 102. The bulkhead 102 is generally rectangular shaped and has opposite lateral ends 108, 110, and top and bottom ends 112, 114. The top end 112 of the bulkhead 102 may define a longitudinally extending opening 116, which may be used to route heating and ventilating ducking as well as providing a drainage conduit for water flowing off the windshield of the motor vehicle 1. The rectangular shaped bulkhead 102 has a first side 118 and a second side 120. The first side 118 faces an engine compartment 122 defined by the modular front end 10, and the second side 120 faces a passenger compartment 124 of the motor vehicle 1.

The bulkhead 102 is preferably cast to have a plurality of integrally formed attachment mounts 126. The attachment mounts 126 provide locations for attaching the drive train assembly 200, the crash energy absorption assembly 300, and the apron assembly 400 to the bulkhead 102. Additionally, the attachment mounts 126 provide locations for attaching additional components of the bulkhead assembly 100 to the bulkhead 102. These additional components, discussed hereinafter, may also be attached directly to the top and bottom ends 112, 114 and first and/or second sides 118, 120 of the bulkhead 102. The integral attachment mounts 126 generally provide specific locations for mounting the various assemblies 200, 300, 400.

The bulkhead assembly 100 further includes additional parts or components, such as structural members 128 or electrical components 130, of the motor vehicle 1. The structural members 128 may include, but are not limited to, a pair of door hinge pillars 132, 134, a pair of rocker panels 136, 138, a pair of windshield support pillars 140, 142, and a windshield cross member 144, each mounted to the bulkhead 102. The electrical components 130 may include, but are not limited to, an electrical junction box 146 and a windshield wiper motor 148.

The pair of door hinge pillars 132, 134 is mounted to the opposite ends 108, 110 of the bulkhead 102. The door hinge pillars 132, 134 are mounted to four (4) attachment mounts 126up located on each of the opposite ends 108, 110 of the bulkhead 110. The door hinge pillars 132, 134 provide mounting locations for mounting the doors of the motor vehicle 1.

The pair of rocker panels 136, 138 is mounted the bulkhead 102 generally opposite from the door hinge pillars 132, 134. The rocker panels 136, 138 are located and attached to the bottom end 114 of the bulkhead 102. The rocker panels 102 are, in turn, connected to the body of the motor vehicle 1 in a conventional manner.

Figure 3:
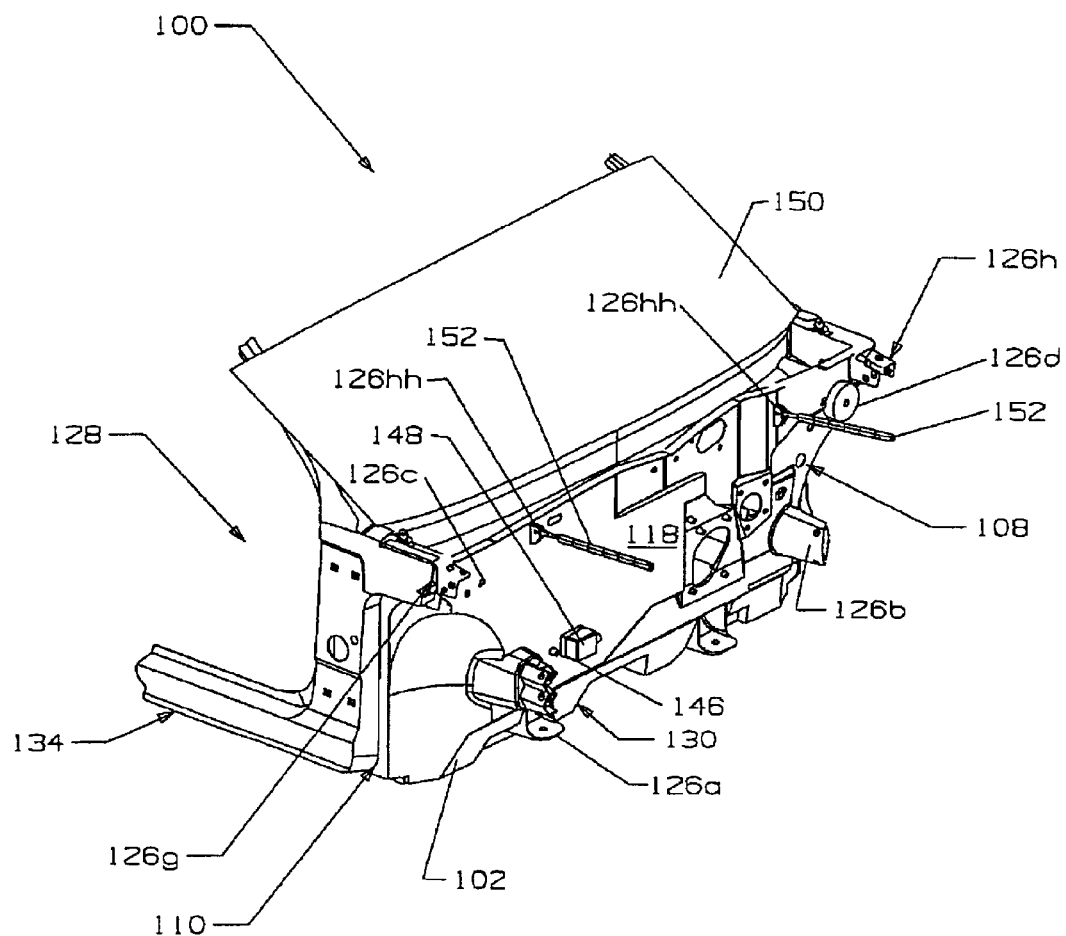
FIG. 3 is a perspective view of a bulkhead assembly used in the modular front end of FIGS. 1 and 2.
Figure 4:
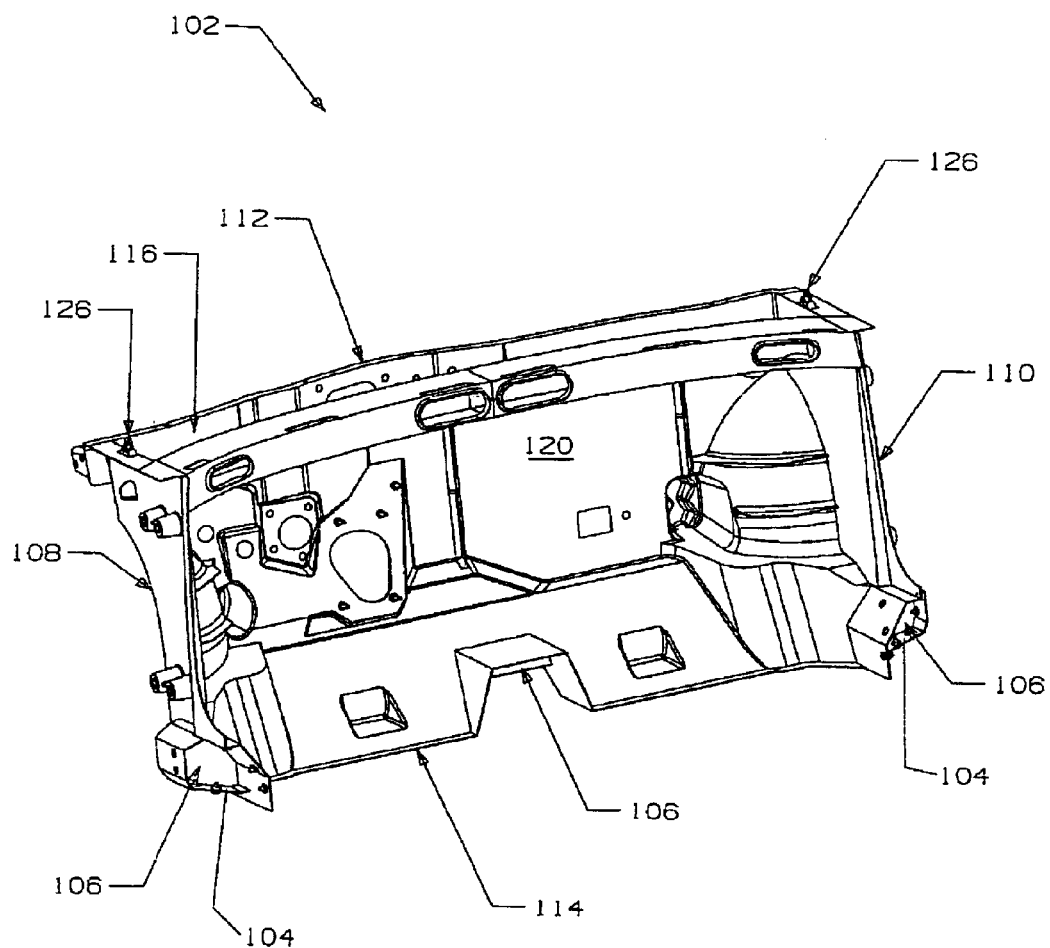
FIG. 4 is a perspective view of a bulkhead used in the bulkhead assembly of FIG. 3 showing the passenger compartment facing side of the bulkhead.
Figure 5:
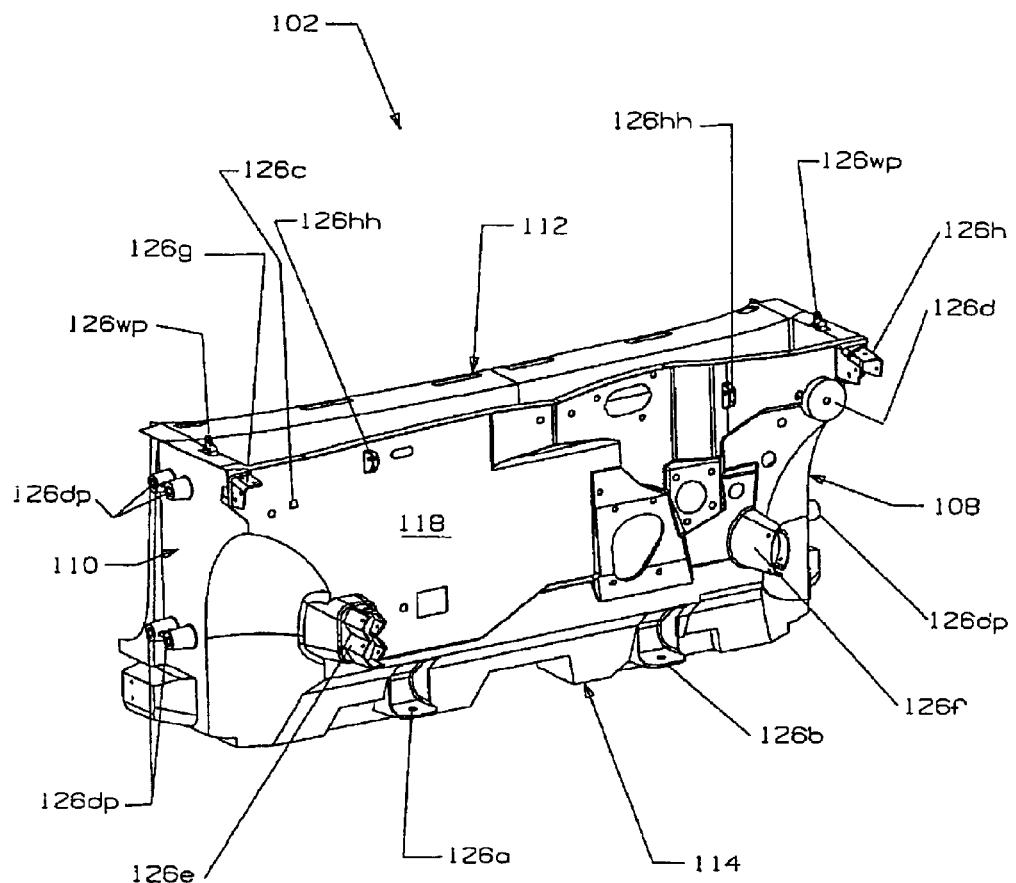
FIG. 5 is a perspective view of the bulkhead used in the bulkhead assembly of FIG. 3 showing the engine compartment facing side of the bulkhead.
Figure 6:
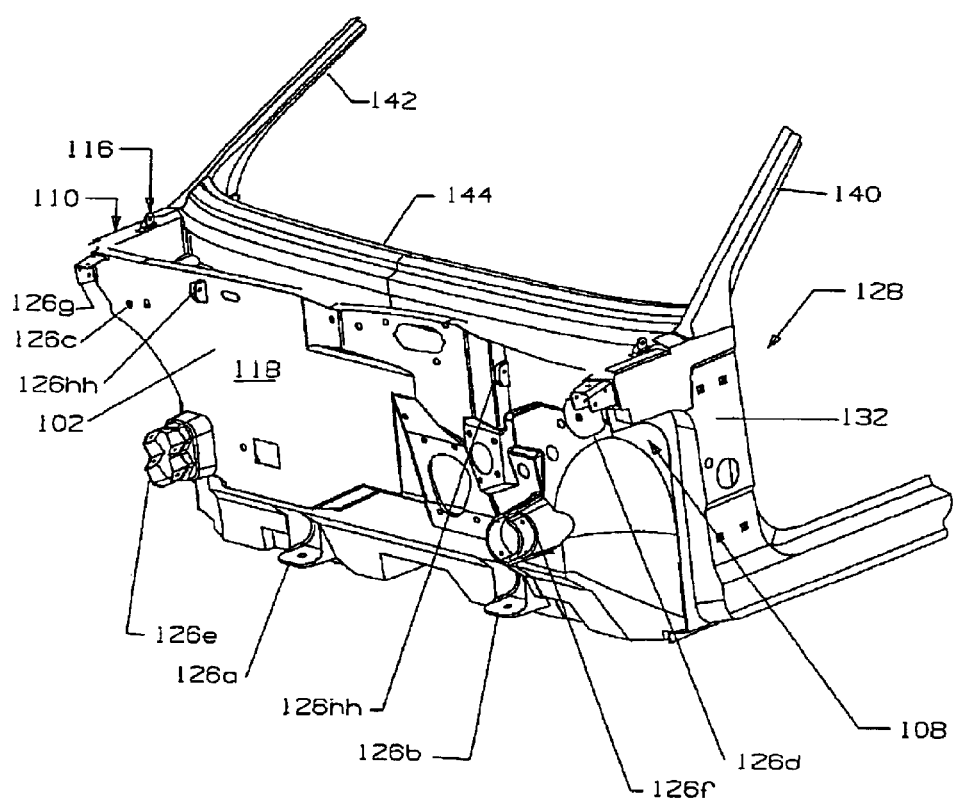
FIG. 6 is a perspective view of the bulkhead assembly generally showing the engine compartment facing side of the bulkhead.
Figure 7:
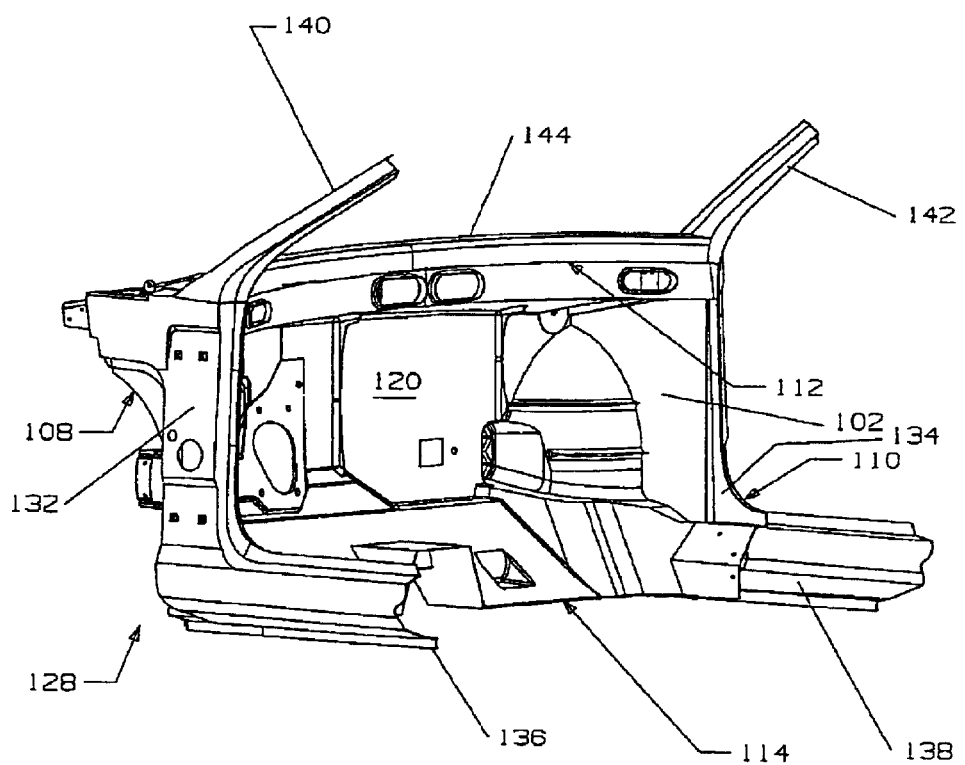
FIG. 7 is a perspective view of the bulkhead assembly generally showing the passenger compartment facing side of the bulkhead.
Figure 8:
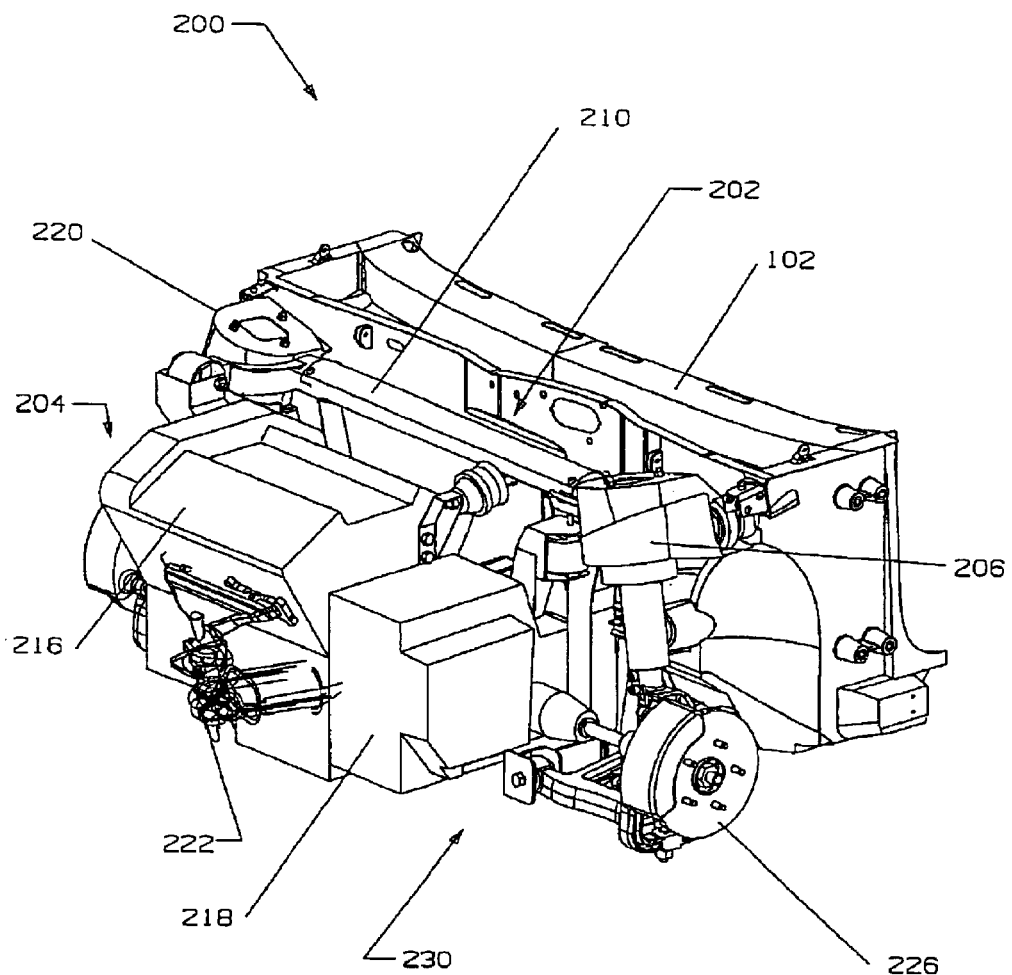
FIG. 8 is a perspective view of a drive train assembly used in the in the modular front end of FIGS. 1 and 2.
Figure 9:
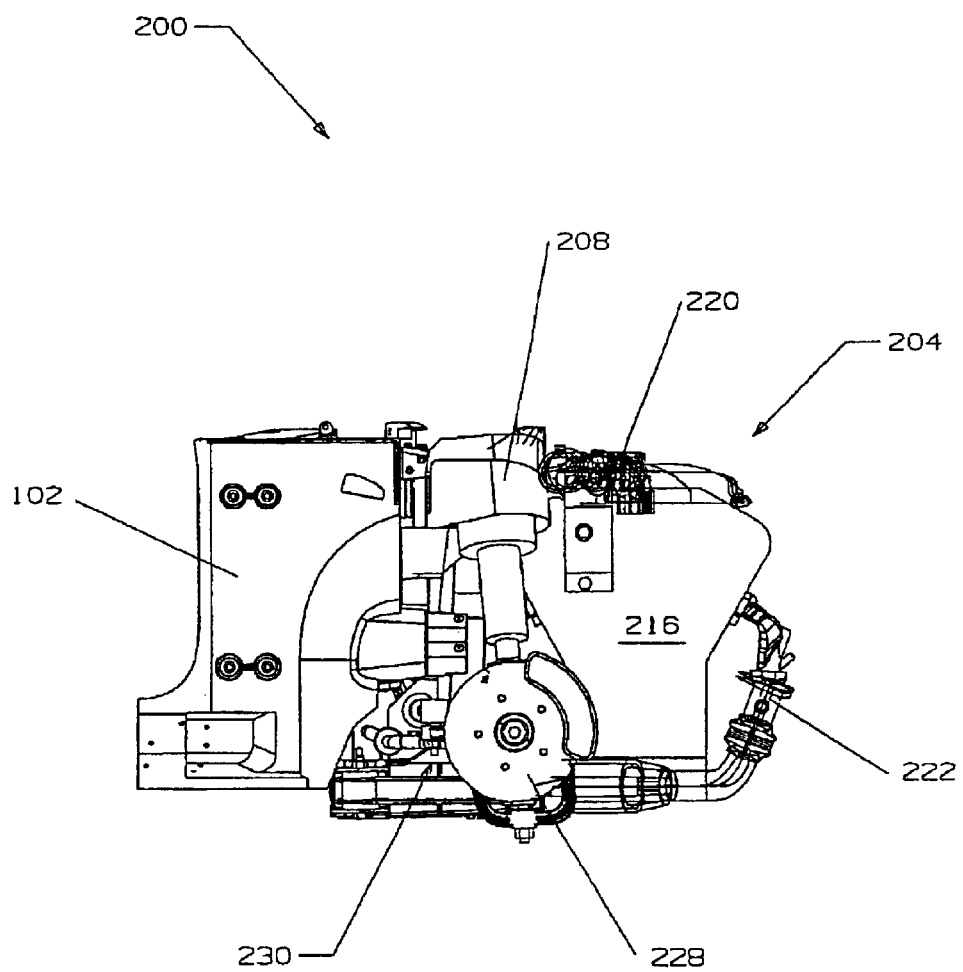
FIG. 9 is a side view of the drive train assembly of FIG. 8.
Figure 10:
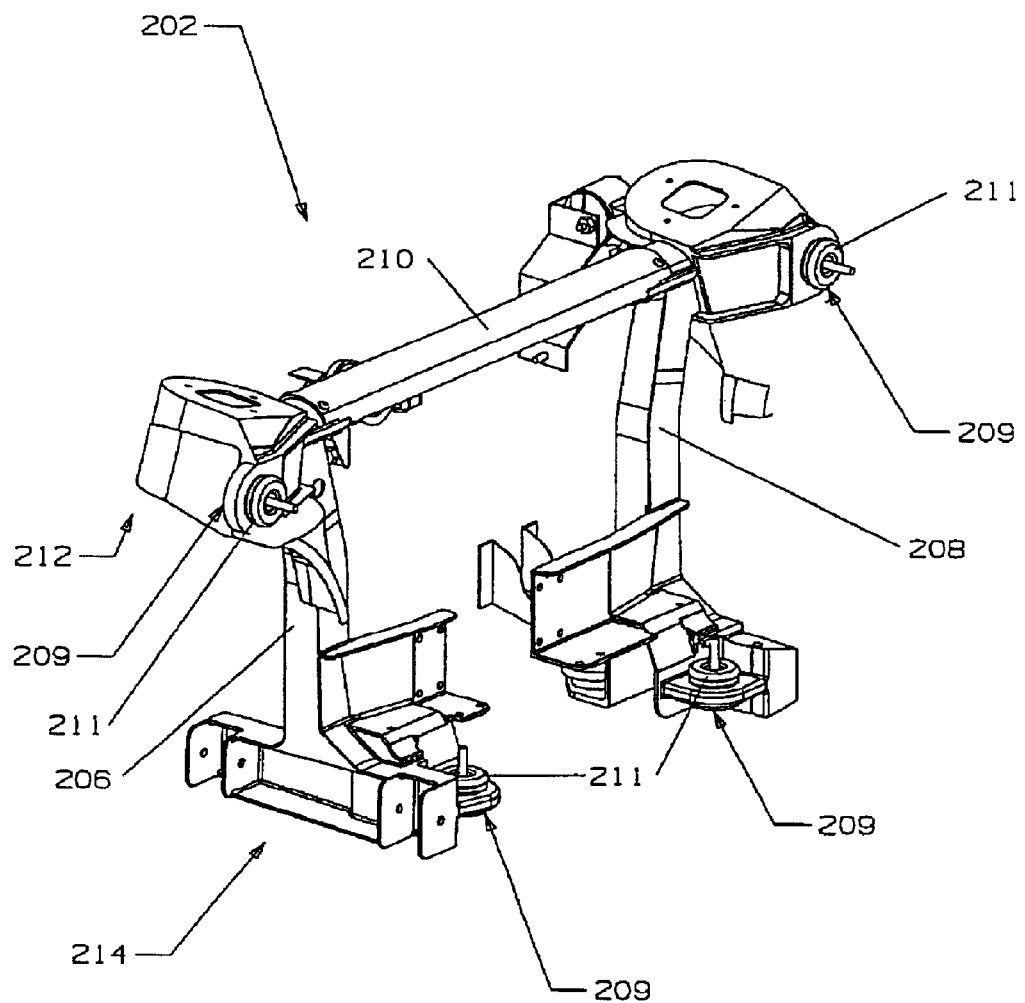
FIG. 10 is a perspective view of a drive train support used in the drive train assembly of FIG. 8.

The pair of windshield support pillars 140, 142 is mounted at the top end 112 of the bulkhead 102. Preferably, the windshield support pillars 140, 142 are mounted to two integral attachment mounts 126wp located at the top end 112 of the bulkhead 102. The windshield support pillars 140, 142 are used to support a windshield 150 of the motor vehicle 1, as shown in FIG. 3. The windshield cross member 144 is also mounted at the top end 112 of the bulkhead 102 between the windshield support pillars 140, 142 to further support the windshield 150.

A pair of hood hinges 152 may be mounted to two (2) attachment mounts 126hh located on the first side 118 of the bulkhead 102. The hood hinges 152 support a hood (not shown) of the motor vehicle 1 in a conventional manner, and may each include hood-lift assist mechanisms (i.e., air cylinders or springs), which are conventional in the art.

As stated previously, various electrical components 130 of the motor vehicle 1 may be attached to the bulkhead 102. In FIG. 3, two exemplary electrical components 130 of the motor vehicle 1 are shown attached to the first side 118 of the bulkhead 102. The electrical components 130 shown include the electrical junction box 146 and the windshield wiper motor 148 of the motor vehicle 1. Additional attachment mounts 126 formed on the first side 118 of the bulkhead 126 are used as attachment points for the drive train assembly 200, crash energy absorption assembly 300, and apron assembly 400, as discussed hereinafter.

Referring to FIGS. 1–3 and 8–13, the drive train assembly 200 is attached to the first side 118 of the bulkhead 102 at four (4) specific attachment mounts 126a, 126b, 126c, 126d formed on the first side 118, which are adapted to support the weight of the drive train assembly 200. The drive train assembly 200 is generally comprised of a drive train support 202 and a power train assembly 204 attached to the drive train support 202. The drive train support 202 is comprised of a pair of elongated support members 206, 208, which are preferably mechanically attached to the bulkhead 102 at the four (4) specific attachment mounts 126a–d on the first side 118 of the bulkhead 102. Each of the support members 206, 208 has two (2) points of connection 209 to the bulkhead 102. Preferably, the points of connection 209 between the support members 206, 208 and the attachment mounts 126a–d on the bulkhead 102 each include a rubber isolation bushing or mount 211 for reducing vibration between the bulkhead 102 and the drive train assembly 200. These attachments are designed to be in orthogonal directions. The support members 206, 208 are preferably cast aluminum or aluminum alloy support members. However, the support members 206, 208 may be cast from other similar metals such as magnesium and alloys thereof or ferrous containing metals and even non-metallic materials such as fiber reinforced polymer composite materials.

A cross member 210 interconnects the support members 206, 208. The cross member 210 is preferably mechanically connected to the support members 206, 208. As used in this disclosure, the terms "mechanically", "mechanically connected", or "mechanical means" and similar phrases are intended to mean the use of mechanical fasteners such as nuts, bolts, rivets, and the like, and their substantial equivalents, and may include the use of vibration isolation joints such as rubber bushings or similar resilient structures as necessary to reduce vibration and noise. The cross member 210 is preferably an extruded aluminum alloy cross member, but may be a cast article and may be made of any of the materials listed previously in connection with the support members 206, 208. The support members each have a top or upper end 212 and a bottom or lower end 214. The cross member 210 preferably connects the top or upper ends 212 of the support members 206, 208.

The power train assembly 204 is supported entirely by the support members 206, 208 and bulkhead 102 in the modular front end 10. There is at least one and, preferably, multiple points of connection between the power train assembly 204 and drive train support 202, as discussed hereinafter. As indicated previously, there are preferably four (4) points of connection between the drive train support 202 and the bulkhead 102 at attachment mounts 126a–d. The support members 206, 208 are attached to the bulkhead 102 and generally extend vertically along the bulkhead 102. Thus, the power train assembly 204 is cantilevered from the support members 206, 208 and the bulkhead 102 in the modular front end 10. By "cantilevered" it is meant that the center of gravity of the power train assembly 204 is positioned outward from the bulkhead 102 and drive train support 202. The attachment mounts 126a–d at the top and bottom ends 112, 114 of the bulkhead 102 provide the vertical support for the power train assembly 204. The attachment mounts 126a, 126b located at the bottom end 114 of the bulkhead 102 are horizontally oriented so that the power train assembly 204 is supported in two planes, horizontal and vertical.

In summary, the power train assembly 204 is substantially supported in a "cantilevered" fashion by a substantially vertically oriented power train support 202, which is connected to the bulkhead 102 mechanically. This is in contrast to typical engine support arrangements currently used in the automotive industry in which a horizontally extending engine cradle supports the engine of the motor vehicle. The engine cradle in known engine support arrangements is rigidly connected to the frame of the motor vehicle and supports the engine from underneath.

Figure 11:
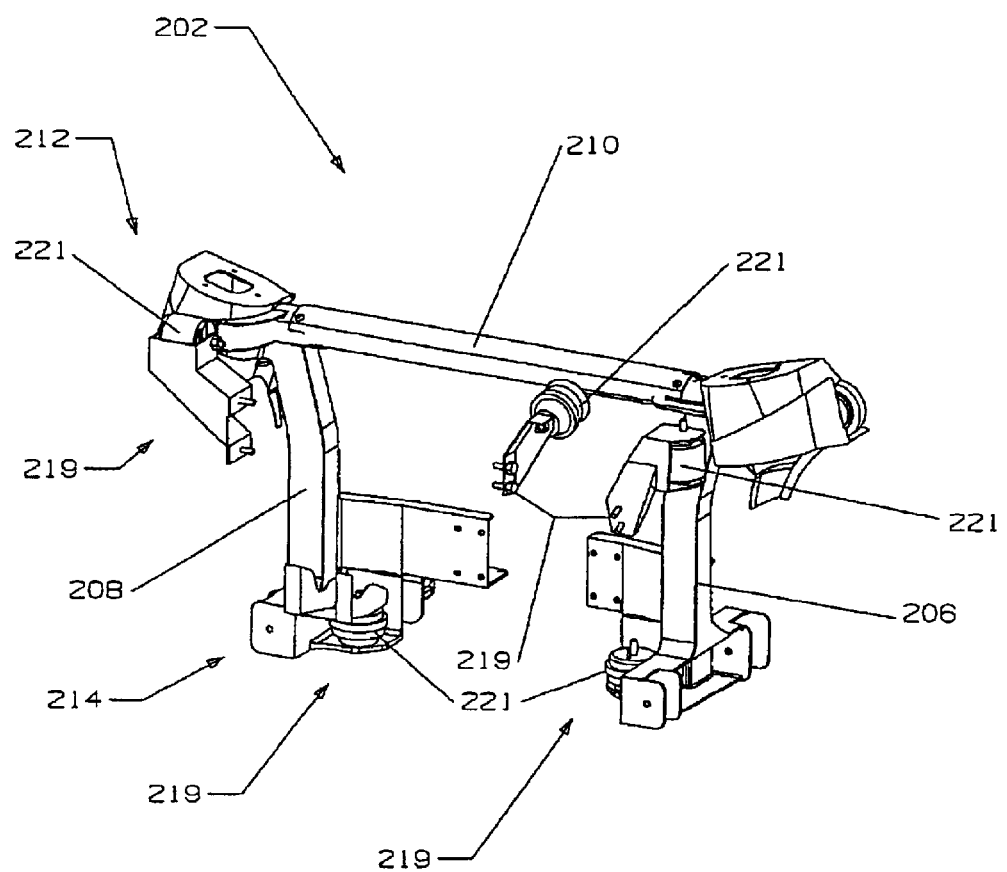
FIG. 11 is a perspective view of the drive train support of FIG. 10 generally viewed from the opposite or reverse side.
Figure 12:
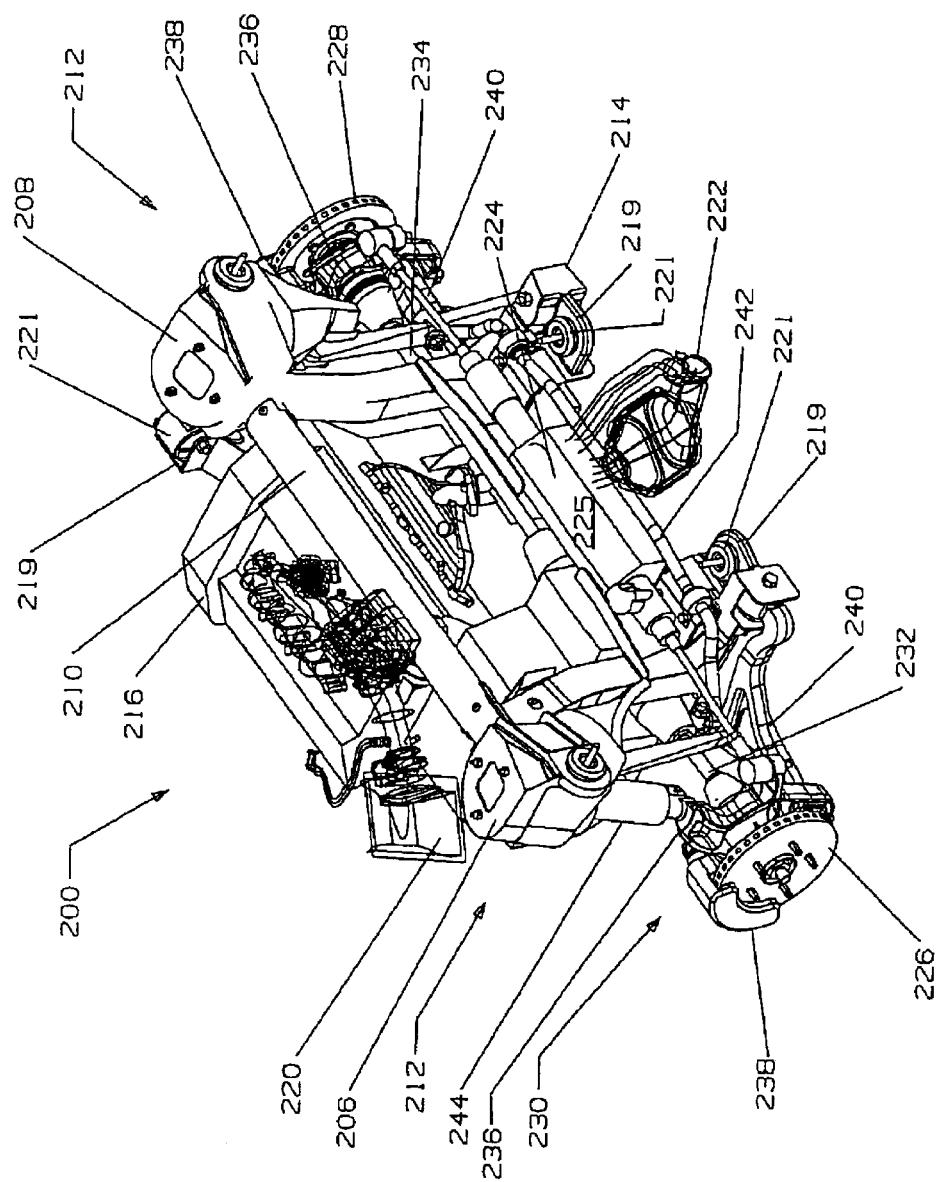
FIG. 12 is a perspective view of the drive train assembly of FIG. 8 with the bulkhead removed and showing the various components of the drive train assembly.
Figure 13:
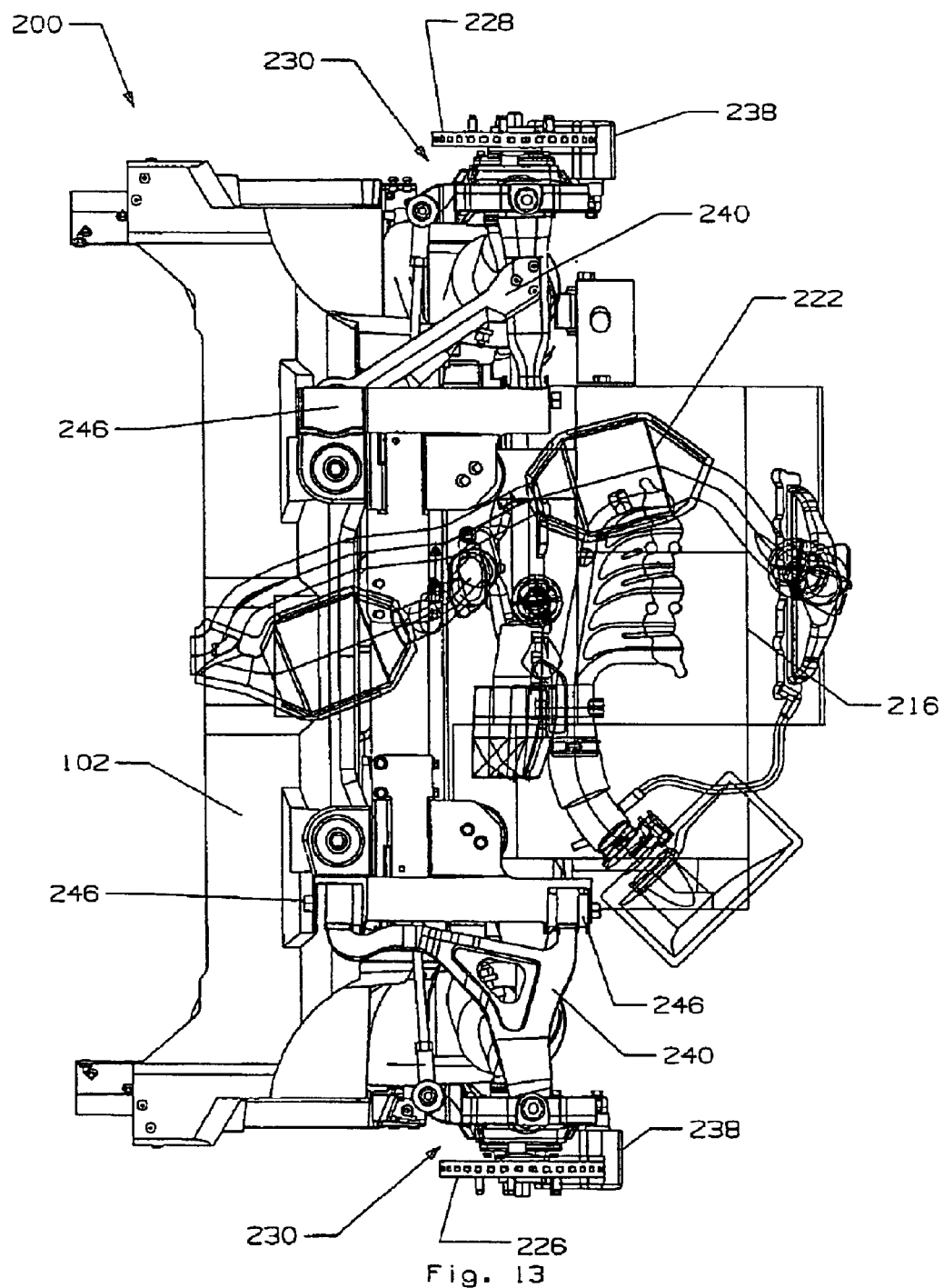
FIG. 13 is a bottom view of the drive train assembly of FIG. 8.

The power train assembly 204 generally includes an engine 216 and a transmission 218 of the motor vehicle 1. The engine 216 has numerous components associated therewith, such as an engine manifold 220 and an engine exhaust 222. In this disclosure, the term "engine" 204 is meant to include the power generating unit of the motor vehicle 1 as well as any accessories directly connected thereto necessary for generating power for the motor vehicle 1. The engine 216 and transmission 218 are mechanically attached to the support members 206, 208 at multiple connection or mounting points 219 as best shown FIGS. 11 and 12. The mounting points 219 may be vibration-isolated through the use of a plurality of rubber isolation bushings or mounts 221, again as best shown in FIGS. 11 and 12.

Additional components of the modular front end 10 may be supported on the drive train support 202, either directly or indirectly. For example, the drive train assembly 200 may further comprise a steering gear 224 of the motor vehicle 1. The steering gear 224 of the motor vehicle 1 is housed within a housing 225. The steering gear 224 is attached to the bottom ends 214 of the support members 206, 208, with the housing 225 interconnecting the support members 206, 208 at the lower end 214 of each of the support members 206, 208. The support members 206, 208, cross member 210, and steering gear 224 and housing 225 form a solid four (4) sided frame for supporting the power train assembly 204. The steering gear 224 is conventional in the art and is configured to be connected to the steering column (not shown) of the motor vehicle 1

The motor vehicle 1 comprises two front wheels 226, 228. A brake and suspension assembly 230 is associated with each of the front wheels 226, 228 to interconnect the front wheels 226, 228 to the drive train assembly 200 and, more particularly, the drive train support 202 The brake and suspension assembly 230 generally includes the components necessary to apply braking to the front wheels 226, 228, and interconnect the front wheels 226, 228 to the drive train assembly 200. The front wheels 226, 228 are respectively connected to two power train shafts 232, 234, which extend outward from the transmission 218 and provide power to the front wheels 226, 228.

The brake and suspension assemblies 230 each include a knuckle 236, a braking assembly 238 connected to the knuckle 236, and a lower control arm 240 connected to the knuckle 236. A sway bar 242 may interconnect the two (2) brake and suspension assemblies 230. The knuckle 236 for each of the assemblies 230 is conventional and may be connected by a shock absorber and spring assembly 244 to the top end 212 of the support members 206, 208 in each assembly 230. The braking assembly 238 (i.e., rotor, caliper etc.) Is also conventional and is supported by the knuckle 236 in each of the assemblies 230. The knuckle 236 in each assembly 230 is connected to the lower end 214 of the respective support members 206, 208 by respective lower control arms 240. The lower control arms 240 are connected to the respective support members 206, 208 mechanically, such as with bushings 246. The bushings 246 may be rubber isolation bushings or mounts as are known in the art. The lower control arm 240 shown on the passenger's or left side of the drive train assembly 200 (top portion of FIG. 13) is the subject matter of U.S. patent application Ser. No. 10/271, 449 filed the same day as this application, Oct. 16, 2002, and entitled "Control Arm For Motor Vehicle Suspension System", and naming Dinesh C. Seksaria and John W. Cobes as inventors. The disclosure of the foregoing U.S. patent application is incorporated fully herein by reference.

The drive train assembly 200 contains each of the components required to make the motor vehicle 1 move, stop, and steer. The drive train support 202 is specifically adapted to support the engine 216 and transmission 218 in the vertical direction, such that the engine 216 and transmission 218 are cantilevered from the bulkhead 102, as defined previously. The bulkhead 102 generally separates the engine compartment 122 from the passenger compartment 124 in the motor vehicle 1. The engine 216 and transmission 218 are now located directly in front of the bulkhead 102 providing an extra layer of protection for occupants of the passenger compartment 124 in the event of a front end collision. Additionally, the engine 216, transmission 218, steering gear 224, and brake and suspension assemblies 230 for the two front wheels 226, 228 are all now compacted tightly within a single sub-assembly, which may be pre-tested as a unit before assembly to the motor vehicle 1. The compact nature of the drive train assembly 200 also provides a more direct and shorter path for exhaust gases from the engine 216, which improves performance and fuel efficiency of the engine 216 while reducing emissions. The compact form of the drive train assembly 200 frees up additional space for expanding the passenger compartment 124 of the motor vehicle 1. Furthermore, the weight of the engine 216 and transmission 218 is centered substantially directly over the wheel axis of the front wheels 226, 228, which will improve the traction and handling of the motor vehicle 1.

Referring to FIGS. 1–3 and 14 and 15, the crash energy absorption assembly 300 is attached to the first side 118 of the bulkhead 102 at two attachment mounts 126e, 126f generally located laterally outside of the attachment mounts 126a–d for the drive train assembly 200. The crash energy absorption assembly 300 is preferably fixedly mounted to the two attachment mounts 126e, 126f The crash energy absorption assembly 300 is used to absorb impact energy during a collision involving the modular front end 10 of the motor vehicle 1 and to manage the energy to avoid injury to occupants of the passenger compartment 124 The crash energy absorption assembly 300 is pre-assembled and attached to the bulkhead 102 in a similar manner to the drive train assembly 200 discussed hereinabove.

Figure 14:
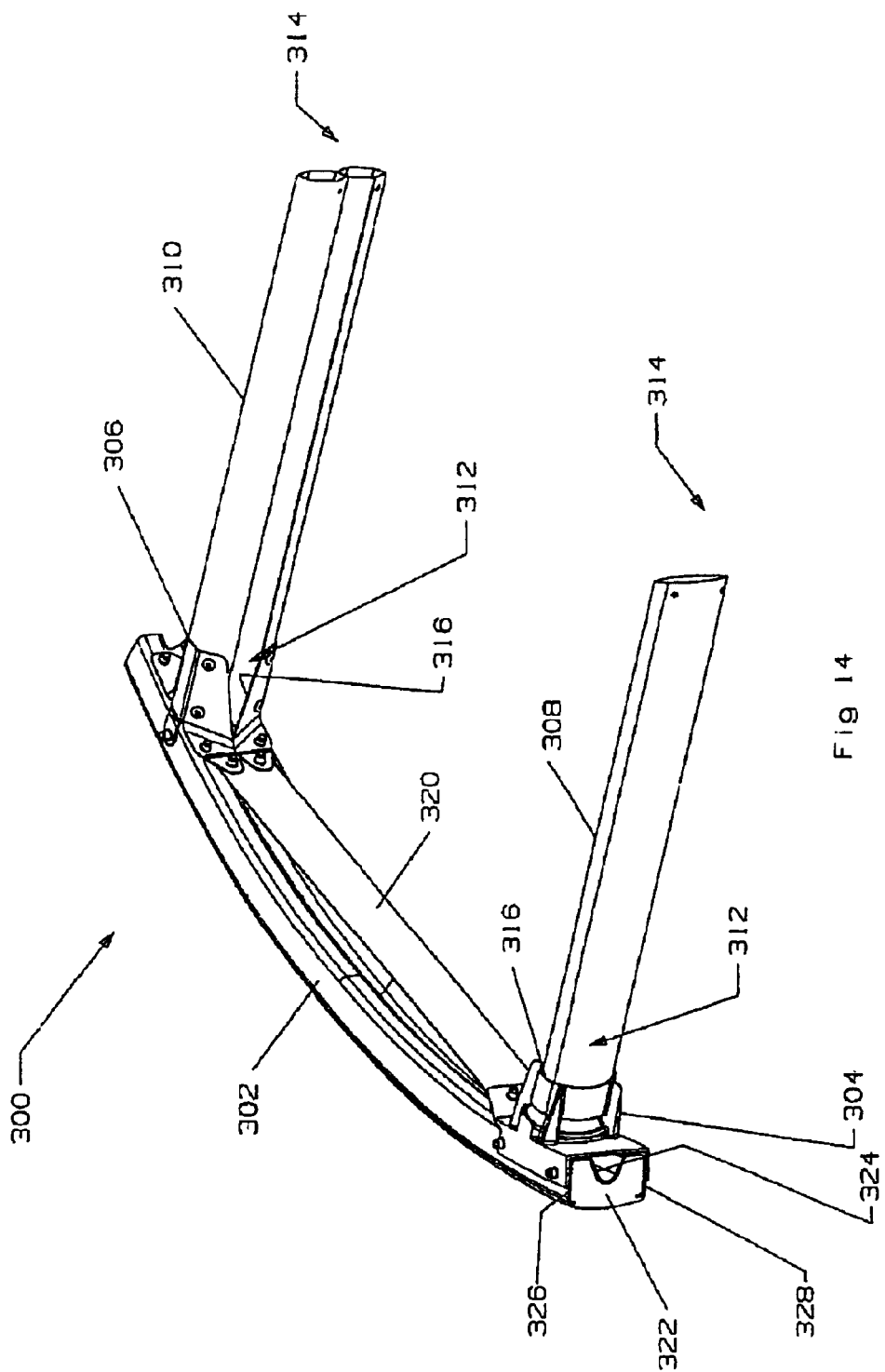
FIG. 14 is a perspective view of a crash energy absorption assembly used in the modular front end of FIGS. 1 and 2.
Figure 15:
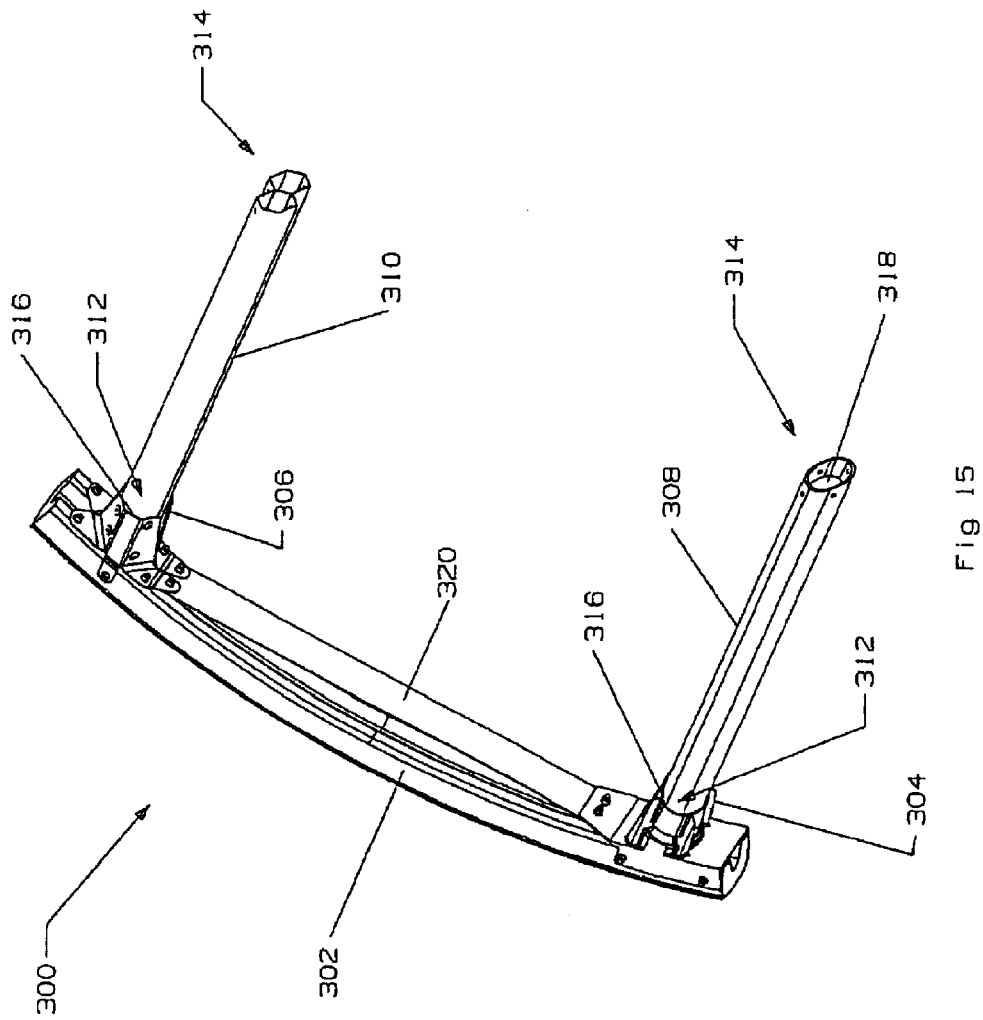
FIG. 15 is a second perspective view of the crash energy absorption assembly used in the in the modular front end of FIGS. 1 and 2.
Figure 16:
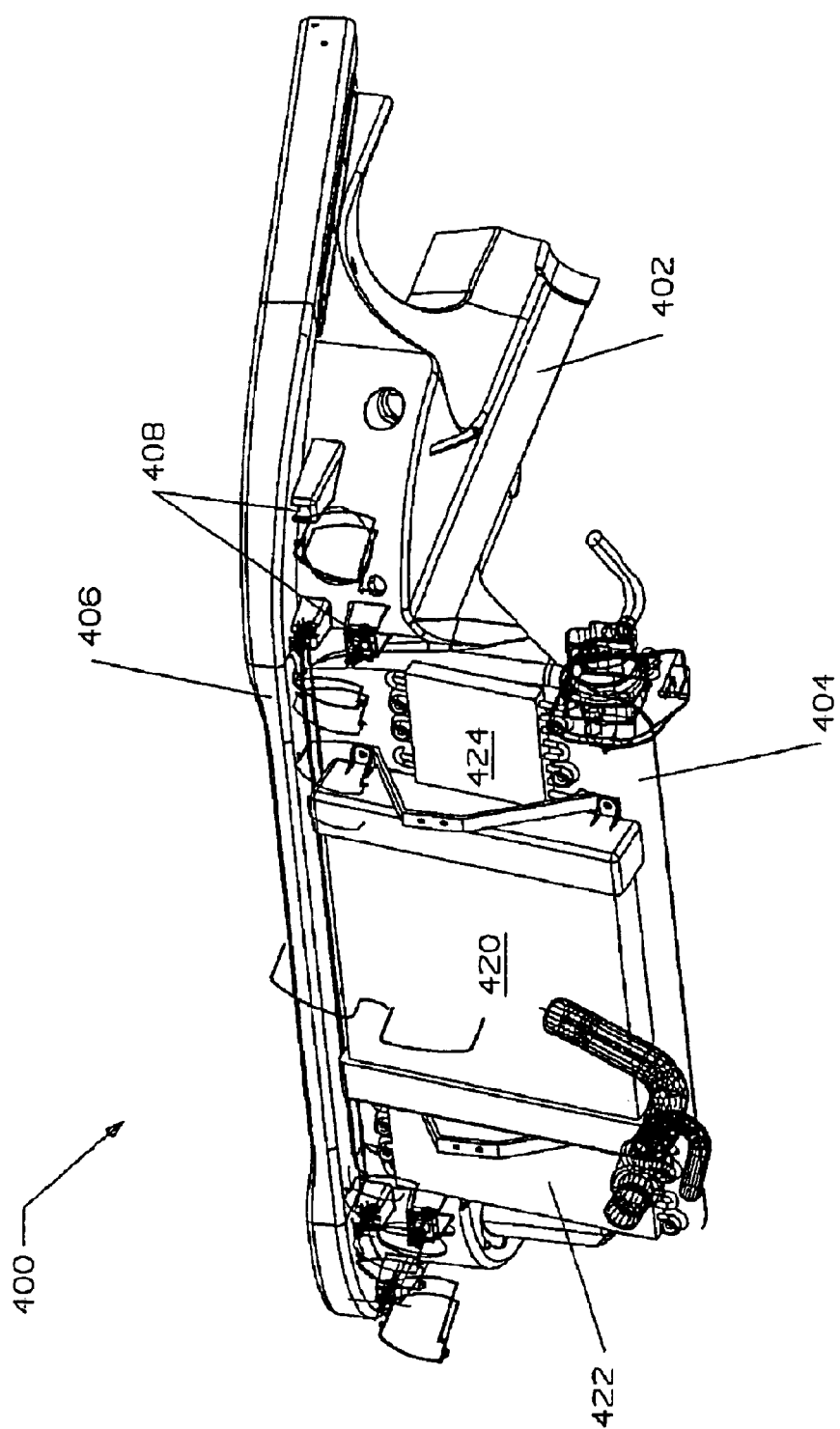
FIG. 16 is a perspective view of an apron assembly used in the in the modular front end of FIGS. 1 and 2.
Figure 17:
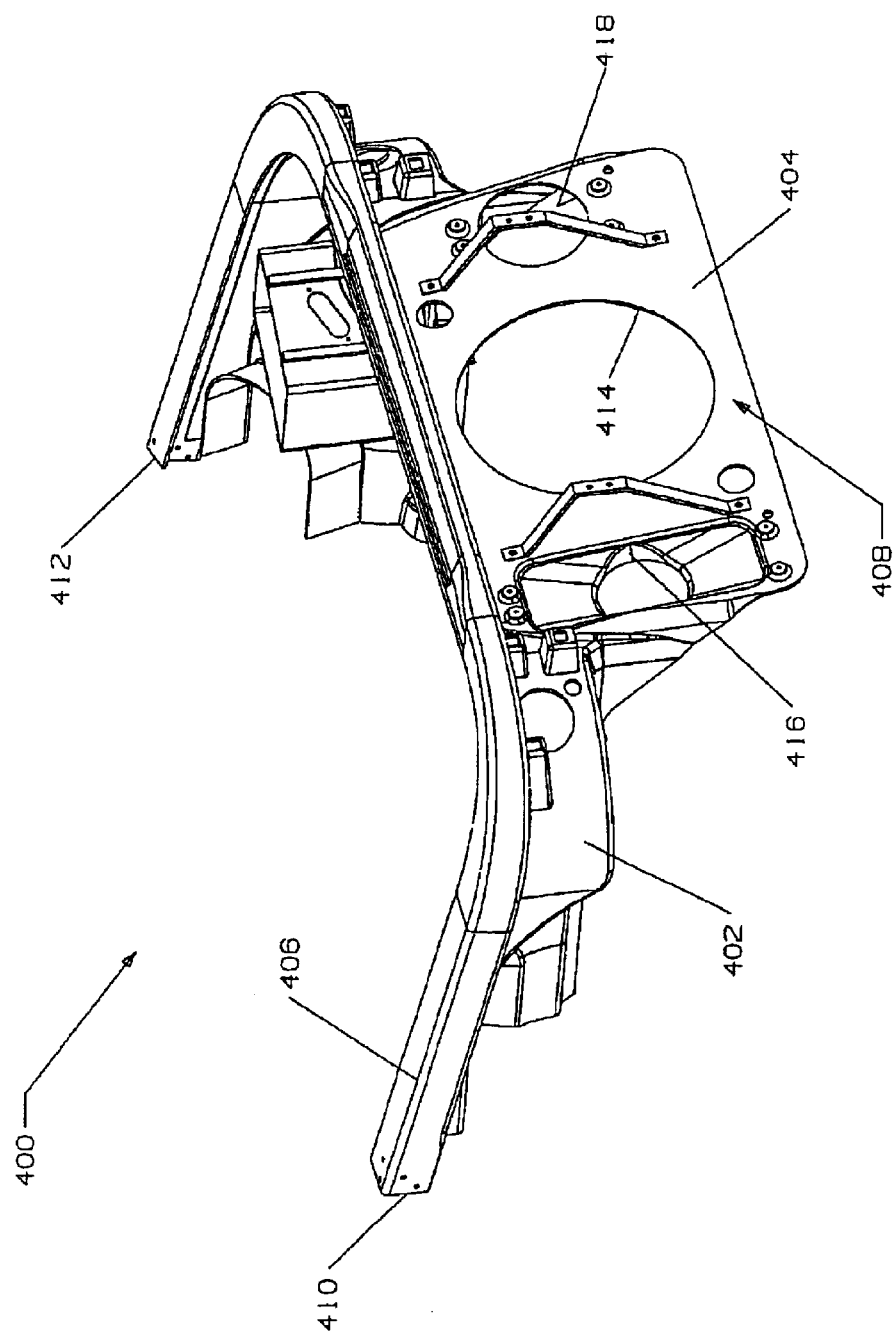
FIG. 17 is a perspective view showing an apron of the apron assembly of FIG. 16.
Figure 18:
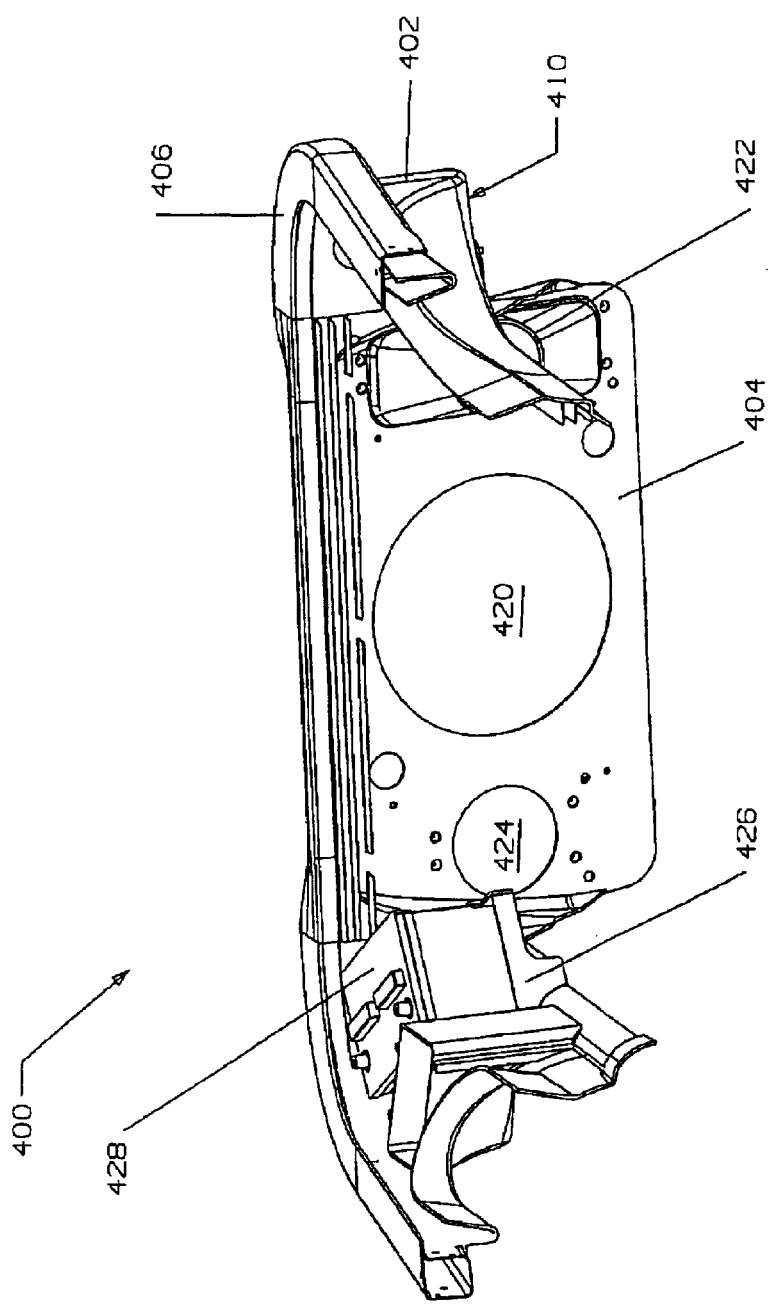
FIG. 18 is a perspective view of the apron assembly of FIG. 16 generally viewed from the opposite or reverse side.
Figure 19:
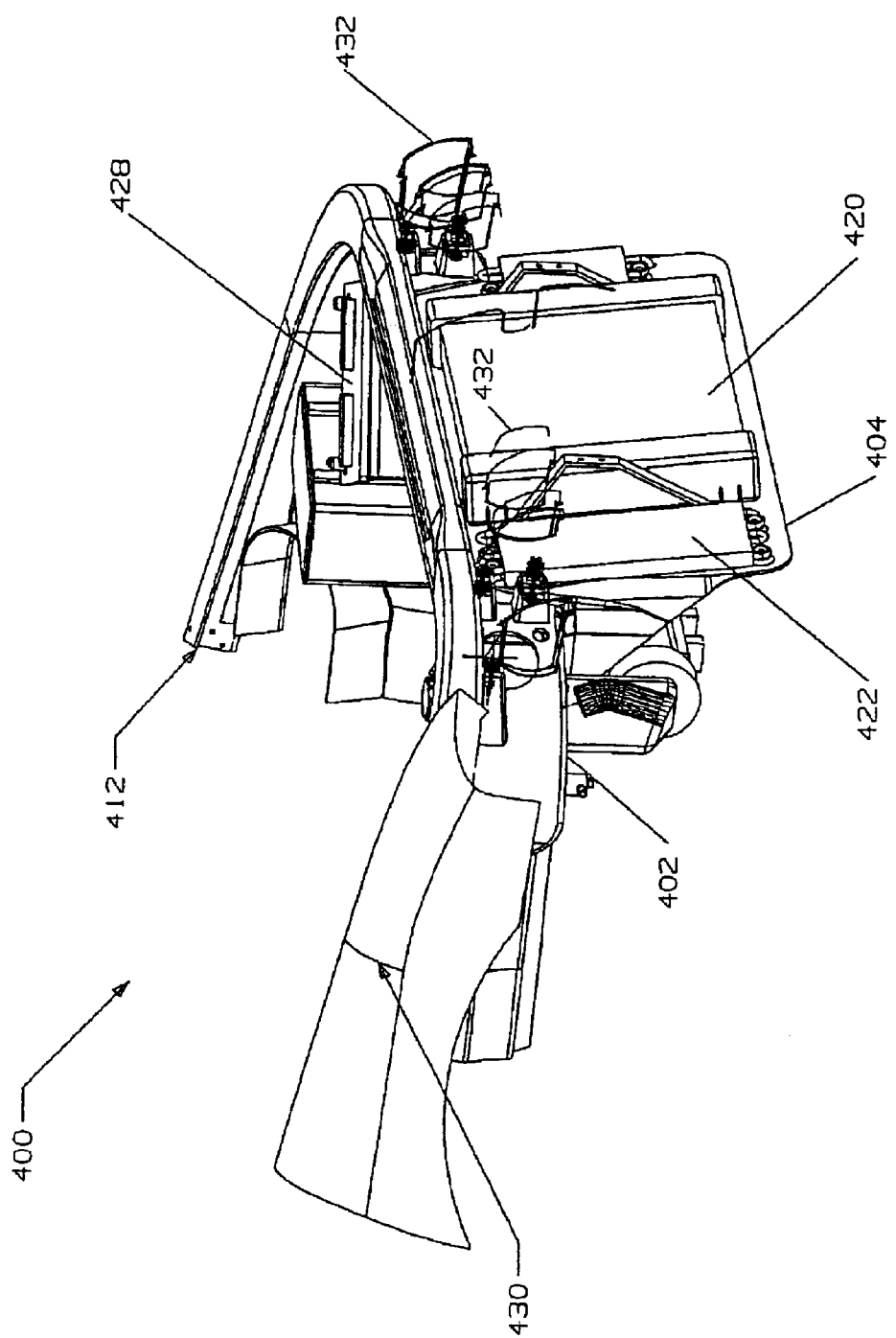
FIG. 19 is a perspective view of the apron assembly of FIG. 16 further showing a fender and headlights of the motor vehicle attached to the apron assembly.

The crash energy absorption assembly 300 is generally comprised of an elongated bumper beam 302, a pair of brackets 304, 306, and a pair of elongated tubes 308, 310. The brackets 304, 306 are attached to the bumper beam 302, preferably by mechanical means. The brackets 304, 306 are preferably taper and flare brackets. In FIGS. 14 and 15 only the right side or driver's side bracket 304 is illustrated as a taper and flare bracket. The left or passenger's side bracket 306 (top of FIGS. 14 and 15) is illustrated as a conventional bracket. The term "brackets 304, 306" is intended to represent both taper and flare and conventional brackets in this disclosure. A suitable taper and flare bracket arrangement for the brackets 304, 306 is disclosed in U.S. patent application Ser. No. 09/932,673 to Summe et al., which is assigned to the common Assignee of this application, and is incorporated herein by reference in its entirety. The brackets 304, 306, when provided as taper and flare brackets, perform the function of tapering and flaring the tubes 308, 310 from the bumper beam 302. When the brackets 304, 306 are conventional brackets, the elongated tubes 308, 310 are preferably crush tubes, which accommodate impact energy involving the modular front end 10 and the crash energy absorption assembly 300.

The tubes 308, 310 each have a first end 312 and a second end 314. The first ends 312 of the tubes 308, 310 are supported by the brackets 304, 306. The brackets 304, 306 each define a socket 316 for receiving and supporting the tubes 308, 310. The first ends 312 of the tubes 308, 310 are received and secured in the sockets 316 defined by the brackets 304, 306, preferably by mechanical means, which may include an interference fit. The second ends 314 of the tubes 308, 310 are configured for connection to the two outer attachment mounts 126e, 126f formed on the first side 118 of the bulkhead 102. The tubes 308, 310 may be made of aluminum or aluminum alloy such as 7003 T6, 6082 T6 aluminum alloys, other aluminum alloys such as 6061 T6 aluminum alloy, high strength steels, or non-metallic materials such as fiber reinforced polymer composite materials.

Any of the 6XXX and 7XXX aluminum alloys as designated by the Aluminum Association may be used for the tubes 308, 310.

The tubes 308, 310 may be at least partially or fully filled with polymeric foam 318. Preferably, the polymeric foam 318 is located at least within the second ends 314 of the tubes 308, 310. The tubes 308, 310 have hollow cross sectional profiles for receiving the polymeric foam 318. The tubes 308, 310 may have different cross sectional profiles, but it is generally preferred that the tubes 308, 310 have the same cross sectional profiles. As shown in FIGS. 14 and 15, the cross sectional profiles for the tubes 308, 310 may be oval or a polygonal shape such as a double hexagon, "figure-8" profile. Other possible cross sectional profiles for the tubes 308, 310 include circular, square, rectangular, and combinations of these profiles and the oval and hexagonal profiles illustrated. Oval or circular cross sectional profiles are preferred for use with taper and flare brackets, while any of the cross sectional profiles indicated hereinabove may be used when the tubes 308, 310 are provided as crush tubes, which are used with traditional, for example stamped steel, brackets.

As stated previously, the brackets 304, 306 may be both taper and flare brackets, or both conventional brackets. In FIGS. 14 and 15, the left (passenger's) side bracket 306 is illustrated as a conventional bracket while the right or driver's side bracket 302 is illustrated as a taper and flare bracket. When the brackets 304, 306 are conventional (i.e., can be made of any specified material but the design is conventional), the tubes 308, 310 are provided as crush tubes that absorb crash energy by crushing or collapsing during a collision involving the modular front end 10.

The bumper beam 302 has a generally curved shape. Since the bumper beam 302 has a generally curved shape, front impact forces on the bumper beam 302 will generate a significant cross spreading force. To counter this, the brackets 304, 306 are connected by a crosstie 320, which manages the transverse spreading force. The crosstie 320 interconnects the brackets 304, 306 for stability. The bumper beam 302, brackets 304, 306, and tubes 308, 310 are preferably each made of aluminum or aluminum alloy. The bumper beam 302 is preferably made of 6013 T6 or 6061 T6 aluminum sheet that is roll formed into an open cross sectional shape. The bumper beam 302 may be made of an aluminum alloy selected from the 6XXX or 7XXX series aluminum alloys. Generally, the bumper beam 302 defines an open cross sectional shape that is at least partially, preferably completely, filled with polymeric foam 322. The bumper beam 302 may also be made of other aluminum alloys such as 7003 T6 or 6082 T6 aluminum alloys, or other alloys selected from the 6XXX or 7XXX series aluminum alloys, or be made from high strength steel sheet. The bumper beam 302 preferably defines a substantially Σ-shaped open cross section. The substantially Σ-shaped cross section comprises a rear wall 324 connected to substantially parallel top and bottom walls 326, 328. A suitable bumper beam 302 having the Σ-shaped open cross section described hereinabove is found in U.S. Pat. No. 6,308,999 to Tan et al. assigned to Alcoa Inc., Pittsburgh, Pa., the common assignee of this application, and is incorporated herein in its entirety.

The brackets 304, 306 are preferably aluminum alloy extrusions and are preferably taper and flare brackets as indicated previously. Suitable aluminum alloys for the taper and flare brackets include 7003 T6 and 6082 T6 aluminum alloys. Again, however, the taper and flare brackets 304, 306 may be made of an aluminum alloy selected from the 6XXX or 7XXX series aluminum alloys. The brackets 304, 306 may also be made from other materials such as high strength steel and non-metallic composite materials such as polymer fibers such as carbon, glass, or arimid. The brackets 304, 306 are preferably mechanically attached to the bumper beam 302 opposite the rear wall 324 in the Σ-shaped cross section of the bumper beam 302.

The crash energy absorption assembly 300 is provided as a pre-assembled unit for attachment to the bulkhead 302 in a similar manner to the drive train assembly 200 discussed previously. The use of aluminum or aluminum alloys in the components of the crash energy absorption assembly 300 reduces the weight of the assembly 300 without sacrificing the energy absorbing requirements of the assembly 300. Further, the positioning of the crash energy absorption assembly 300 generally around the drive train assembly 200 enhances the overall compactness of the modular front end 10 of the present invention.

Referring to FIGS. 1–3 and 16–19, the apron assembly 400 is generally positioned on top of the drive train assembly 200 and the crash energy absorption assembly 300. The apron assembly 400 is pre-assembled and attached to the bulkhead 102 in a similar manner to the drive train assembly 200 and crash energy absorption assembly 300 discussed previously. The apron assembly 400 generally extends around the circumference of the engine compartment 122 defined by the modular front end 10. The apron assembly 400 generally collects the miscellaneous engine accessories of the motor vehicle 1 and provides convenient locations for mounting these accessories.

The apron assembly 400 is generally comprised of a unitary apron member 402 having a depending front portion 404 and an apron rail 406 attached to a top end of the apron member 402. The apron member 402 is substantially C-shaped. The apron member 402 preferably defines a plurality of integrally formed accessory attachment mounts 408. The apron 406 rail is also substantially C-shaped and is attached to the top end of the apron member 402. The apron rail 406 has two ends 410, 412 configured for attachment to the bulkhead 102. In particular, the ends 410, 412 are configured for connection to two (2) attachment mounts 126g, 126h located adjacent the top end 112 of the bulkhead 102. The connections between the ends 410, 412 and the attachment mounts 126g, 126h are preferably made by mechanical fasteners.

The apron member 402 is preferably a unitary member made of molded plastic having the accessory attachment mounts 408 integrally formed therewith. The apron rail 406 is preferably a one-piece, aluminum, and preferably hydroformed rail having differing cross sections along its length and is attached to the apron member 402 mechanically. The differing cross sections provide additional locations for mounting front end accessories used in the modular front end 10. The accessory attachment mounts 408 may include integrally formed mounting points or openings defined in the apron member 402 for supporting various front end accessories As stated, the apron assembly 400 generally collects the miscellaneous front end engine accessories of the motor vehicle 1, which otherwise must be individually assembled to the front end of the motor vehicle 1. Examples of such accessories include, but are not limited to, the radiator, coolant overflow bottle, transmission oil cooler, air conditioner condenser, fans, headlights, horn, battery, electrical fuse box, integral wire harnesses, windshield wiper washer fluid bottle, and air pump, etc. Several of the larger and more complex front end engine accessories will be discussed hereinafter. The smaller front end accessories, such as the coolant overflow bottle and windshield wiper washer fluid bottle (not shown), easily attach to the apron member 402 at the accessory attachment mounts 408 by mechanical fasteners, as will be appreciated by those skilled in the art.

The front portion 404 of the apron member 402 defines a plurality of openings, hereinafter identified as first opening 414, second opening 416, and third opening 418. The first opening 414 is formed centrally in the front portion 404 and supports a radiator and cooling fan assembly 420. The radiator and cooling fan assembly 420 is supported in the first opening 414 by conventional means, such as mechanical fasteners. The second opening 416 is defined adjacent the first opening 414 and supports an air conditioning condenser 422 of the motor vehicle 1. The third opening 422 is defined on the other side of the first opening 414 and supports a transmission oil cooler 424. The air conditioning condenser 422, and transmission oil cooler 424 may be fixed in the respective second and third openings 416, 418 by conventional means (i.e., mechanical fasteners).

The apron member 402 further comprises an integrally formed battery hold-down 426 for supporting a battery 426 of the motor vehicle 1. The battery 428 may be supported in the battery hold-down 426 by means conventional in the art, such as straps and mechanical fasteners.

The apron assembly 400 provides a lightweight structure for collecting and supporting the miscellaneous front end accessories required for the motor vehicle 1. The apron assembly 400 is pre-assembled in a similar manner to the drive train assembly 200 and the crash energy absorption assembly 300. Each of the accessories attached to the apron member 402 may be pretested prior to the apron assembly 400 being attached to the bulkhead 102. A similar procedure may be followed for the power train assembly 204, steering and braking assembly 224, and axle assembly 240 in the drive train assembly 200.

Furthermore, the apron assembly 400, particularly the apron rail 406, provides a convenient mounting structure for fenders 430 and other front end components of the motor vehicle 1, as indicated previously. Additionally, headlights 432 of the motor vehicle 1 may be attached to the front portion 404 of the apron member 402, which provides a convenient location for supporting the headlights 432 of the motor vehicle 1. The fenders 430 and headlights 432 may be attached to the apron assembly 400 by conventional means (i.e., mechanical fasteners and the like).

With the respective "modular" sub-assemblies 100–400 now described, a method of assembling the modular front end 10 for attachment to the motor vehicle 1 will now be discussed with reference to FIGS. 1–21. The method of assembling the modular front end 10 generally begins with providing the bulkhead assembly 100 having the structural members 128 and electrical components 130 pre-attached thereto. The bulkhead 102 of the bulkhead assembly 100 provides the main structural member for supporting each of the pre-assembled sub-assemblies 200–400 to follow. The bulkhead 102 may be provided separate from the body of the motor vehicle 1, or pre-attached to the body of the motor vehicle 1. The various assemblies 200–400 may then be mounted to the pre-attached bulkhead 102.

Figure 20:
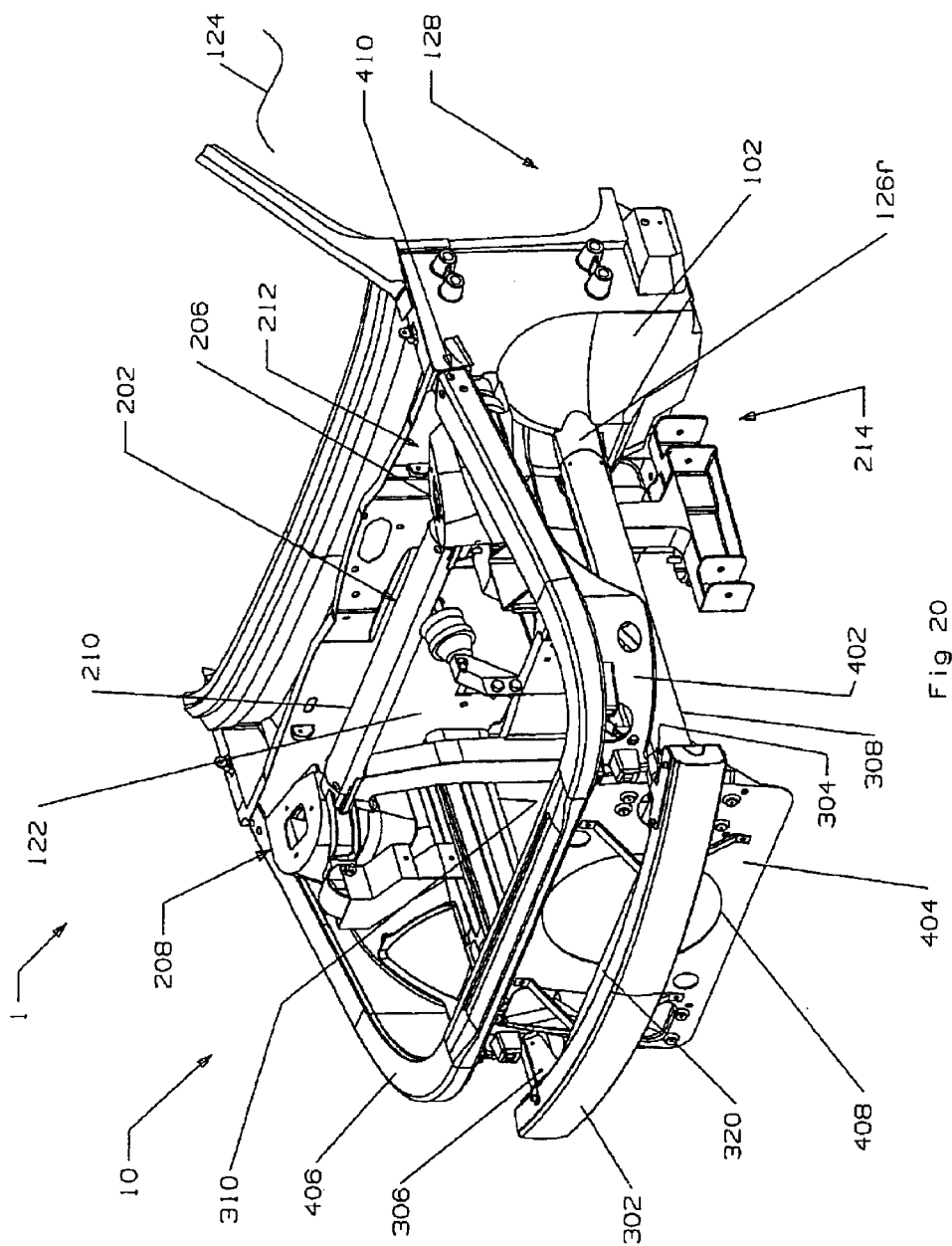
FIG. 20 is a perspective view of the modular front end of FIGS. 1 and 2 showing only the structural components of the various assemblies.

Next, the drive train assembly 200 is attached to the bulkhead 102 at the four (4) drive train assembly attachment mounts 126a–d located on the first side 118 of the bulkhead 102 FIGS. 20 and 21 show the "structural elements" of the respective assemblies 100–400, with all "accessories" omitted for clarity in showing the mounting connections for the drive train assembly 200, crash energy absorption assembly 300, and apron assembly 400. As described previously, the drive train support 202 is affixed directly to the bulkhead 102. The power train assembly 204, which generally comprises the engine 216 and transmission 218 of the motor vehicle 1, is cantilevered from the drive train support 202 and bulkhead 102. The drive train assembly 200, as discussed previously is provided pre-assembled, with the power train assembly 204 pre-attached to the drive train support 202 and the engine 216 and transmission 218 pre-tested. The steering gear 224, which is connected to the steering column of the motor vehicle 1, interconnects the lower ends 214 of the support members 206, 208 to form a solid box frame structure, as described previously. The brake and suspensions assemblies 230 may be connected to the drive train support 202 in the manner described previously and pre-tested for function.

Once the drive train support 202 and pre-tested power train assembly 204 are attached to the bulkhead 102, the crash energy absorption assembly 300 may be attached to the bulkhead 102 at the attachment mounts 126e, 126f, which are generally located outside of the drive train support 202 attachment mounts 126a–d used to support the drive train assembly 200. The crash energy absorption assembly 300 is provided pre-assembled such that it is only necessary to attach the second ends 314 of the tubes 308, 310 to their corresponding attachment mounts 126e, 126f on the first side 118 of the bulkhead 102.

With the drive train assembly 200 and the crash energy absorption assembly 300 attached to the bulkhead 102, the apron assembly 400 may be attached to the bulkhead 102. The apron assembly 400 is attached to the bulkhead 102 by affixing the ends 410, 412 of the apron rail 406 at the apron assembly attachment mounts 126g, 126h generally located adjacent the top end 112 of the bulkhead 102. The apron member 402 is partially supported in the vertical direction by the tubes 308, 310. In particular, a bottom end of the front portion 404 of the apron member 402 rests on the tubes 308, 310 to provide vertical support for the apron assembly 400. The front portion 404 of the apron member 402 may be attached to the crosstie 320 connecting the brackets 304, 306 in the crash energy absorption assembly 300. An adhesive may be used between the bottom end of the front portion 404 of the apron member 402 and the surfaces of the tubes 308, 310 to further secure the apron assembly 400 to the crash energy absorption assembly 400. All attachments between the drive train assembly 200, crash energy absorption assembly 300, and apron assembly 400 and the bulkhead 102 are preferably made with mechanical fasteners. Rubber bushings or mounts as discussed previously may be used in the connections between the drive train assembly 200 and the bulkhead 102 to isolate these assemblies and minimize vibration as indicated previously.

In an alternative method of assembly, the apron assembly 400 may be attached first to the crash energy absorption assembly 300. This "combined" assembly (crash energy absorption assembly 300 and apron assembly 400) may then be attached as a unit to the bulkhead 102. The combined crash energy absorption assembly 300 and apron assembly 400 is then attached to the bulkhead 102 in the manner described previously. Once again, the bulkhead 102 may be detached from or pre-attached to the body of the motor vehicle 1.

The modular front end of the present invention results in higher quality motor vehicles and reduced costs to the manufacturer. Motor vehicle assembly lines may be shortened because the "sub-modules" or sub-assemblies described hereinabove collect numerous individual parts that previously had to be individually assembled to the motor vehicle. Accordingly, an increased number of car bodies may be put through the assembly line in a given period of time. The modular front end also reduces the mass of the motor vehicle, which improves performance and the fuel efficiency of the motor vehicle. Additionally, the modular front end preferably uses mechanical fasteners at all connection points rather than metallurgical joints, which reduces production time and cost. In general, the modular front end of the present invention improves the speed and quality at which motor vehicles are constructed.

The invention claimed is:

1. A modular front end for a motor vehicle, comprising:
   a structural bulkhead comprising a plurality of attachment mounts;
   a drive train assembly attached to and supported by the bulkhead at the attachment mounts;
   a crash energy absorption assembly attached to and supported by the bulkhead at the attachment mounts; and
   an apron assembly attached to and supported by the bulkhead at the attachment mounts.

2. The modular front end of claim 1, wherein the apron assembly is at least partially supported in the vertical direction by the crash energy absorption assembly.

3. The modular front end for a motor vehicle, comprising:
   unitary cast bulkhead comprising a plurality of integrally formed attachment mount;
   a drive train assembly attached to the bulkhead at the attachment mounts;
   a crash energy absorption assembly attached to the bulkhead at the attachment mounts; and
   an apron assembly attached to the bulkhead at the attachment mounts.

4. The modular front end of claim 1, further comprising at least one structural member of the motor vehicle attached to the bulkhead.

5. The modular front end of claim 1, wherein the bulkhead comprises a first side for facing an engine compartment of the motor vehicle and a second side for facing a passenger compartment of the motor vehicle, and further comprising at least one electrical component of the motor vehicle attached to the first side of the bulkhead.

6. The modular front end of claim 1, the drive train assembly comprising:
   a drive train support comprising a pair of elongated support members attached to the bulkhead and a cross member interconnecting the support members; and
   a power train assembly attached to the support members such that the power train assembly is cantilevered from the support members and bulkhead forward of the cross member.

7. The modular front end of claim 6, wherein the support members and cross member are made of aluminum alloy.

8. The modular front end of claim 6, the power train assembly comprising an engine and transmission of the motor vehicle cantilevered from the support members and bulkhead forward of the cross member.

9. The modular front end of claim 6, wherein the support members each comprise a top end and a bottom end, and the cross member connects the top ends of the support members, and further comprising a steering gear of the motor vehicle attached to the bottom ends of the support members and interconnecting the bottom ends of the support members.

10. The modular front end of claim 9, further comprising a brake and suspension assembly for each front wheel of the motor vehicle, the brake and suspension assemblies attached to the support members, respectively.

11. The modular front end of claim 1, the crash energy absorption assembly comprising:
    an elongated bumper beam;
    a pair of brackets attached to the bumper beam; and
    a pair of tubes each having a first end and a second end, the first ends of the tubes supported by the brackets, and the second ends attached to the bulkhead at the attachment mounts.

12. The modular front end of claim 11, wherein the bumper beam, brackets, and tubes are made of aluminum alloy.

13. The modular front end of claim 11, wherein the bumper beam defines a substantially open cross section at least partially filled with polymeric foam.

14. The modular front end of claim 11, wherein the bumper beam defines a substantially $\Sigma$-shaped cross section, the substantially $\Sigma$-shaped cross section comprising a rear wall connected to substantially parallel top and bottom walls.

15. The modular front end of claim 3, the crash energy absorption assembly comprising:
    an elongated bumper beam;
    a pair of taper and flare brackets attached to the bumper beam; and
    a pair of tubes each having a first end and a second end, the first ends of the tubes supported by the brackets, and the second ends attached to the bulkhead at the attachments mounts.

16. The modular front end of claim 11, wherein the tubes are at least partially filled with polymeric foam.

17. The modular front end of claim 3, the apron assembly comprising:
    a substantially C-shaped, unitary apron member having a depending front portion, the apron member defining at least one integrally formed accessory attachment mount; and
    a substantially C-shaped apron rail attached to a top end of the apron member and having ends thereof attached to the bulkhead.

18. The modular front end of claim 17, the apron assembly further comprising at least one engine accessory of the motor vehicle attached to the apron member at the at least one accessory attachment mount.

19. The modular front end of claim 17, wherein the apron member is formed of molded plastic material and the apron rail is made of aluminum alloy.

20. The modular front end of claim 17, wherein the at least one engine accessory is selected from the group consisting of a radiator and cooling fan assembly, an air conditioning condenser, a transmission oil cooler, and a battery.

21. A motor vehicle, comprising:
    a vehicle body; and
    a modular front end connected to the vehicle body, the modular front end comprising:
        a structural bulkhead comprising a plurality of attachment mounts;
        a drive train assembly attached to and supported by the bulkhead at the attachment mounts;
        a crash energy absorption assembly attached to and supported by the bulkhead at the attachment mounts; and an apron assembly attached to and supported by the bulkhead at the attachment mounts.

22. The motor vehicle of claim 21, wherein the apron assembly is at least partially supported in the vertical direction by the crash energy absorption assembly.

23. A motor vehicle, comprising:
a vehicle body; and
a modular front end connected to the vehicle body, the modular front end comprising:
a unitary cast bulkhead comprising a plurality of integrally formed attachment mounts;
a drive train assembly attached to the bulkhead at the attachment mounts;
a crash energy absorption assembly attached to the bulkhead at the attachment mounts; and
an apron assembly attached to the bulkhead at the attachment mounts.

24. The motor vehicle of claim 21, further comprising at least one structural member of the motor vehicle attached to the bulkhead.

25. The motor vehicle of claim 21, wherein the bulkhead comprises a first side for facing an engine compartment of the motor vehicle and a second side for facing a passenger compartment of the motor vehicle, and further comprising at least one electrical component of the motor vehicle attached to the first side of the bulkhead.

26. The motor vehicle of claim 21, the drive train assembly comprising:
a drive train support comprising a pair of elongated support members attached to the bulkhead and a cross member interconnecting the support members; and
a power train assembly attached to the support members such that the power train assembly is cantilevered from the support members and bulkhead forward of the cross member.

27. The motor vehicle of claim 26, wherein the support members and cross member are made of aluminum alloy.

28. The motor vehicle of claim 26, the power train assembly comprising an engine and transmission of the motor vehicle cantilevered from the support members and bulkhead forward of the cross member.

29. The motor vehicle of claim 26, wherein the support members each comprise a top end and a bottom end, and the cross member connects the top ends of the support members, and further comprising a steering gear of the motor vehicle attached to the bottom ends of the support members and interconnecting the bottom ends of the support members.

30. The motor vehicle of claim 29, further comprising a brake and suspension assembly for each front wheel of the motor vehicle, the brake and suspension assemblies attached to the support members, respectively.

31. The motor vehicle of claim 21, the crash energy absorption assembly comprising:
an elongated bumper beam;
a pair of brackets attached to the bumper beam; and
a pair of tubes each having a first end and a second end, the first ends of the tubes supported by the brackets, and the second ends attached to the bulkhead at the attachment mounts.

32. The motor vehicle of claim 31, wherein the bumper beam, brackets, and tubes are made of aluminum alloy.

33. The motor vehicle of claim 31, wherein the bumper beam defines a substantially open cross section at least partially filled with polymeric foam.

34. The motor vehicle of claim 31, wherein the bumper beam defines a substantially Σ-shaped cross section, the substantially Σ-shaped cross section comprising a rear wall connected to substantially parallel top and bottom walls.

35. The motor vehicle of claim 23, the crash energy absorption assembly comprising:
an elongated bumper beam;
a pair of taper and flare brackets attached to the bumper beam; and
a pair of tubes each having a first end and a second end, the first ends of the tubes supported by the brackets, and the second ends attached to the bulkhead at the attachment mounts.

36. The motor vehicle of claim 31, wherein the tubes are at least partially filled with polymeric foam.

37. The motor vehicle of claim 23, the apron assembly comprising:
a substantially C-shaped, unitary apron member having a depending front portion, the apron member defining at least one integrally formed accessory attachment mount; and
a substantially C-shaped apron rail attached to a top end of the apron member and having ends thereof attached to the bulkhead.

38. The motor vehicle of claim 37, the apron assembly further comprising at least one engine accessory of the motor vehicle attached to the apron member at the at least one accessory attachment mount.

39. The motor vehicle of claim 37, wherein the apron member is formed of molded plastic material and the apron rail is made of aluminum alloy.

40. The motor vehicle of claim 37, wherein the at least one engine accessory is selected from the group consisting of a radiator and cooling fan assembly, an air conditioning condenser, a transmission oil cooler, and a battery.

41. A method of assembling a modular front end for a motor vehicle, comprising the steps of:
providing a structural bulkhead comprising a plurality of attachment mounts;
attaching a drive train assembly to the bulkhead at the attachment mounts the drive train assembly supported by the bulkhead;
attaching a crash energy absorption assembly to the bulkhead at the attachment mounts the crash energy absorption assembly supported by the bulkhead; and
attaching an apron assembly to the bulkhead at the attachment mounts the apron assembly supported by the bulkhead.

42. The method of assembling a modular front end of a motor vehicle, comprising the steps of:
casting a unitary bulkhead, comprising a plurality of attachment mounts formed integrally with the unitary bulkhead;
attaching a crash energy absorption assembly to the bulkhead at the attachment mounts; and
attaching an apron assembly to the bulkhead at the attachment mounts.

43. The method of claim 42, wherein the bulkhead is cast from aluminum alloy.

44. The method of claim 41, further comprising the step of attaching at least one structural member of the motor vehicle to the bulkhead.

45. The method of claim 41, wherein the bulkhead comprises a first side for facing an engine compartment of the motor vehicle and a second side for facing a passenger compartment of the motor vehicle, the method further comprising the step of attaching at least one electrical component of the motor vehicle to the first side of the bulkhead.

46. The method of claim 41, wherein the bulkhead comprises a first side for facing an engine compartment of the motor vehicle and a second side for facing a passenger compartment of the motor vehicle, and wherein the drive train assembly, crash energy absorption assembly, and apron assembly are attached mechanically to attachment mounts located on the first side of the bulkhead.

47. The method of claim 41, wherein the drive train assembly comprises a drive train support and an power train assembly, the power train assembly comprising an engine and transmission of the motor vehicle attached to the drive train support, the step of attaching the drive train assembly to the bulkhead comprising attaching the drive train support to the bulkhead at the attachment mounts such that the power train assembly is cantilevered from the drive train support and bulkhead.

48. The method of claim 47, wherein the power train support comprises a pair of support members each having a top end and a bottom end and a cross member connecting the top ends of the support members, the method further comprising the step of attaching a steering gear of the motor vehicle to the bottom ends of the support members to interconnect the support members.

49. The method of claim 48, the drive train assembly further comprising a brake and suspension assembly for each front wheel of the motor vehicle, the method further comprising the step of attaching the brake and suspension assemblies to the support members, respectively.

50. The method of claim 41, wherein the crash energy absorption assembly comprises an elongated bumper beam, a pair of brackets attached to the bumper beam, and a pair of tubes each having a first end and a second end, the first ends of the tubes supported by the brackets, the step of attaching the crash energy absorption assembly to the bulkhead comprising attaching the second ends of the tubes to the bulkhead at the attachment mounts.

51. The method of claim 41, wherein the apron assembly is at least partially supported in a vertical direction by the crash energy absorption assembly.

52. The method of claim 41, wherein the apron assembly comprises an apron member, the method further comprising the step of attaching at least one engine accessory of the motor vehicle to the apron member.

53. The method of claim 52, wherein the at least one engine accessory is selected from the group consisting of a radiator and cooling fan assembly, an air conditioning condenser, a transmission oil cooler, and a battery.

54. The method of claim 42, wherein the apron assembly comprises a substantially C-shaped apron member and a substantially C-shaped apron rail, the method further comprising the step of attaching the apron rail to a top end of the apron member.

55. The method of claim 54, wherein the ends of the apron rail are configured for connection to the bulkhead at the attachment mounts, the step of attaching the apron assembly to the bulkhead comprising attaching the ends of the apron rail to the bulkhead at the attachment mounts.

56. The method of claim 54, further comprising the step of attaching a fender of the motor vehicle to the apron rail.

57. The method of claim 54, the apron member having a depending front portion, the method further comprising the step of attaching headlights of the motor vehicle to the front portion.

58. The method of claim 41, wherein the bulkhead is provided attached to the body of a motor vehicle.

\* \* \* \* \*

UNITED STATES PATENT AND TRADEMARK OFFICE
CERTIFICATE OF CORRECTION

PATENT NO. : 6,755,461 B2
DATED : June 29, 2004
INVENTOR(S) : Dinesh C. Seksaria et al.

It is certified that error appears in the above-identified patent and that said Letters Patent is hereby corrected as shown below:

Column 6,
Line 35, insert a -- . -- after "assembly".

Column 9,
Line 13, "126up" should read -- 126dp --.

Column 11,
Line 43, after "by" add -- the --.

Column 12,
Line 26, after "124" add -- . --.

Column 15,
Line 66, after "102" add -- . --.

Column 17,
Line 28, "The" should read -- A --.
Line 30, "mount" should read -- mounts --.

Column 18,
Line 33, "attachments" should read -- attachment --.

UNITED STATES PATENT AND TRADEMARK OFFICE
CERTIFICATE OF CORRECTION

PATENT NO. : 6,755,461 B2
DATED : June 29, 2004
INVENTOR(S) : Dinesh C. Seksaria et al.

It is certified that error appears in the above-identified patent and that said Letters Patent is hereby corrected as shown below:

<u>Column 20,</u>
Line 48, "The" should read -- A --.
Line 50, remove "," after "bulkhead".
Line 53, insert as a new paragraph after "bulkhead;" -- attaching a drive train assembly to the bulkhead at the attachment mounts; --.
Line 58, insert a -- . -- after "aluminum" and delete "alloy".
Lines 63 and 64, "for" should read -- of --.

Signed and Sealed this

Twenty-first Day of December, 2004

JON W. DUDAS
*Director of the United States Patent and Trademark Office*